United States Patent
Ulupinar et al.

(10) Patent No.: US 8,199,688 B2
(45) Date of Patent: Jun. 12, 2012

(54) SIGNALING AND MANAGEMENT OF BROADCAST-MULTICAST WAVEFORM EMBEDDED IN A UNICAST WAVEFORM

(75) Inventors: Fatih Ulupinar, San Diego, CA (US); Parag A. Agashe, San Diego, CA (US); Ragulan Sinnarajah, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 1048 days.

(21) Appl. No.: 12/053,583

(22) Filed: Mar. 22, 2008

(65) Prior Publication Data

US 2009/0238106 A1    Sep. 24, 2009

(51) Int. Cl.
*H04H 20/71*    (2008.01)
*H04W 4/00*    (2009.01)

(52) U.S. Cl. ........................ 370/312; 370/328
(58) Field of Classification Search .............. 370/312, 370/328

See application file for complete search history.

(56) References Cited

U.S. PATENT DOCUMENTS

2008/0232294 A1*  9/2008  Ulupinar et al. .............. 370/312
2008/0291868 A1* 11/2008  Prakash et al. .............. 370/328

FOREIGN PATENT DOCUMENTS

EP    1850560 A1    10/2007

OTHER PUBLICATIONS

3GPP2: "C.S0084-009-0, Version 2.0, Broadcast-Multicast Upper Layer for Ultra Mobile Broadband (UMB) Air Interface Specification" Internet Citation, [Online] XP002462007 Retrieved from the Internet: URL:http://www.3gpp2.org/Public_html/specs/C.S0084-009-0_v2.0_070904.pdf> [retrieved on Nov. 12, 2007] pp. 2-1, line 1—pp. 2-2, last line, pp. 2-34, line 11—pp. 2-36, line 29, figures 2-2. International Search Report & Written Opinion—PCT/US2009/036082, International Search Authority—European Patent Office—Jul. 17, 2009.

* cited by examiner

Primary Examiner — Kenny Lin
(74) Attorney, Agent, or Firm — Howard Seo

(57) ABSTRACT

Embodiments describe overlaying a broadcast multicast channel on top of a unicast network. Messages can be generated by protocols in a broadcast/multicast (BCMC) stack and tunneled through an IRTP of a serving access node. These messages can be transmitted on a BCMC channel and/or a unicast channel. Other messages can be generated by protocols in a unicast stack and tunneled to a B-IRTP of a BCMC Access node and transmitted on a BCMC channel to an access terminal.

25 Claims, 21 Drawing Sheets

SIGNALING AND MANAGEMENT OF BROADCAST-MULTICAST WAVEFORM EMBEDDED IN A UNICAST WAVEFORM

BACKGROUND

I. Field

The following description relates generally to communication systems and more particularly to communicating broadcast-multicast waveforms.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and other systems.

Wireless communication systems have become a prevalent means by which majority of people worldwide have come to communicate. Wireless communication devices have become smaller and more powerful in order to meet consumer needs, improve portability and convenience. The increase in processing power in mobile devices such as cellular telephones has lead to an increase in demands on wireless network transmission systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one, or all the data streams carried by the composite stream. Likewise, a mobile terminal can transmit data to the base station or another mobile terminal.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with signaling and management of broadcast-multicast waveform embedded in a unicast waveform.

An aspect relates to a method for tunneling multi-user packets of a unicast waveform over a broadcast-multicast waveform. The method includes generating a message though protocols in a unicast stack associated with an access node. The method also includes tunneling the message to a broadcast/multicast Inter-Route Tunneling Protocol (B-IRTP) of a broadcast/multicast (BCMC) Access Node and transmitting the message on a BCMC channel to an access terminal for output to a user. The access node and the BCMC Access Node can communicate over an IOS interface.

Another aspect relates to a wireless communications apparatus that includes a memory and a processor. The memory can retain instructions related to generating a message though protocols in a unicast stack associated with an access node and tunneling the message to a broadcast/multicast Inter-Route Tunneling Protocol (B-IRTP) of a broadcast/multicast (BCMC) Access Node. The memory can also retain instructions relating to transmitting the message on a BCMC channel to an access terminal for output to a user. The access node and the BCMC Access Node can communicate over an IOS interface. The processor can be coupled to the memory and can be configured to execute the instructions retained in the memory.

A further aspect relates to a wireless communications apparatus that tunnels multi-user packets of a unicast waveform over a broadcast-multicast waveform. The apparatus can include a means for generating a message though protocols in a unicast stack associated with an access node and a means for tunneling the message to a broadcast/multicast Inter-Route Tunneling Protocol (B-IRTP) of a broadcast/multicast (BCMC) Access Node. Also included can be a means for transmitting the message on a BCMC channel to an access terminal for output to a user. The access node and the BCMC Access Node can communicate over an IOS interface.

Yet another aspect relates to a machine-readable medium having stored thereon machine-executable instructions for tunneling multi-user packets of a unicast waveform over a broadcast-multicast waveform. The instructions can include generating a message though protocols in a unicast stack associated with an access node and tunneling the message to a broadcast/multicast Inter-Route Tunneling Protocol (B-IRTP) of a broadcast/multicast (BCMC) Access Node. The instructions can also include routing the message through a B-PCP/B-MAC/B-PHY of the BCMC Access Node and transmitting the message on a BCMC channel to an access terminal for output to a user. The access node and the BCMC Access Node can communicate over an IOS interface.

In a wireless communications system, an aspect relates to an apparatus comprising a processor. The processor can be configured to generate a message though protocols in a unicast stack associated with an access node and tunnel the message to a broadcast/multicast Inter-Route Tunneling Protocol (B-IRTP) of a broadcast/multicast (BCMC) Access Node. The processor can also be configured to route the message through a B-PCP/B-MAC/B-PHY of the BCMC Access Node and transmit the message on a BCMC channel to an access terminal for output to a user. The access node and the BCMC Access Node can communicate over an IOS interface.

In a related aspect is a method for receiving tunneled multi-user packets of a unicast waveform over a broadcast-multicast waveform. The method includes receiving a message over a broadcast-multicast waveform and tunneling the message though a broadcast/multicast Inter-Route Tunneling Protocol (B-IRTP). The method also includes routing the message though a unicast stack and outputting the message to a user.

Another aspect relates to a wireless communications apparatus comprising a memory and a processor. The memory can retain instructions relating to receiving a message over a broadcast-multicast waveform and tunneling the message though a B-IRTP. The memory can also retain instructions relating to routing the message though a unicast stack and outputting the message to a user. The processor can be coupled to the memory and can be configured to execute the instructions retained in the memory.

Still another aspect relates to a wireless communications apparatus that receives multi-user packets of a unicast waveform over a broadcast-multicast waveform. The apparatus can include a means for receiving a message over a broadcast-multicast waveform and a means for tunneling the message though a B-IRTP. The apparatus can also include a means for routing the message though a unicast stack and a means for outputting the message to a user.

A further aspect relates to a machine-readable medium having stored thereon machine-executable instructions for receiving tunneled multi-user packets of a unicast waveform over a broadcast-multicast waveform. The instructions include receiving a message over a broadcast-multicast waveform and tunneling the message though a B-IRTP. The instructions can also include routing the message though a unicast stack and outputting the message to a user.

In a wireless communications system, another aspect relates to an apparatus that includes a processor. The processor can be configured to receive a message over a broadcast-multicast waveform and tunnel the message though a B-IRTP. The processor can also be configured to review a type field in a Broadcast Packet Consolidation Protocol (B-PCP) header. Further, the processor can be configured to route the message though a unicast stack and output the message to a user. The type field can indicate whether the message is a BCMC signaling message.

In a related aspect is a method for tunneling out of band signaling of a broadcast-multicast waveform over a unicast waveform. The method includes generating a message through protocols in a broadcast/multicast (BCMC) stack and transmitting the message over a unicast waveform for rendering on a mobile device.

Another aspect relates to a wireless communications apparatus that includes a memory and a processor. The memory can retain instructions relating to generating a message through protocols in a broadcast/multicast (BCMC) stack and transmitting the message over a unicast waveform for rendering on a mobile device. The processor can be coupled to the memory and can be configured to execute the instructions retained in the memory.

A further aspect relates to a wireless communications apparatus that tunnels out of band signaling of a broadcast-multicast waveform over a unicast waveform. The apparatus includes a means for generating a message through protocols in a broadcast/multicast (BCMC) stack and a means for transmitting the message over a unicast waveform for rendering on a mobile device.

Still another aspect relates to a machine-readable medium having stored thereon machine-executable instructions for tunneling out of band signaling of a broadcast-multicast waveform over a unicast waveform. The instructions include generating a message through protocols in a broadcast/multicast (BCMC) stack. The instructions also include transmitting the message over a unicast waveform for rendering on a mobile device.

In a wireless communications system, another aspect relates to an apparatus comprising a processor. The processor can be configured to generate a message through protocols in a broadcast/multicast (BCMC) stack and tunnel the message though an Inter-Route Tunneling Protocol (IRTP) of a serving access node. The processor can also be configured to transmit the message over a unicast waveform for rendering on a mobile device.

In a related aspect is a method for receiving a tunneled out of band signaling of a broadcast-multicast waveform over a unicast waveform. The method includes receiving a message over a unicast waveform and processing the message through a unicast stack. The method also includes routing the message to a broadcast/multicast (BCMC) stack and outputting the message to a user.

Another aspect relates to a wireless communications apparatus that includes a memory and a processor. The memory can retain instructions relating to receiving a message over a unicast waveform and processing the message through a unicast stack. The memory can also retain instructions relating to routing the message to a broadcast/multicast (BCMC) stack and outputting the message to a user. The processor can be coupled to the memory and can be configured to execute the instructions retained in the memory.

Still another aspect relates to wireless communications apparatus that receives a tunneled out of band signaling of a broadcast-multicast waveform over a unicast waveform. The apparatus includes a means for receiving a message over a unicast waveform and a means for processing the message through a unicast stack. The apparatus can also includes a means for routing the message to a broadcast/multicast (BCMC) stack and a means for outputting the message to a user.

Yet another aspect relates to a machine-readable medium having stored thereon machine-executable instructions for tunneling out of band signaling of a broadcast-multicast waveform over a unicast waveform. The instructions include receiving a message over a unicast waveform and processing the message through a unicast stack. The instructions also include routing the message to a broadcast/multicast (BCMC) stack and outputting the message to a user.

In a wireless communications system, another aspect relates to an apparatus that includes a processor. The processor can be configured to receive a message over a unicast waveform and process the message through a unicast stack. The processor can also be configured to tunnel the message though an Inter-Route Tunneling Protocol (IRTP) and transmit the message through a PHY MAC of the unicast stack. Further, the processor can be configured to route the message to a broadcast/multicast (BCMC) stack and output the message to a user.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
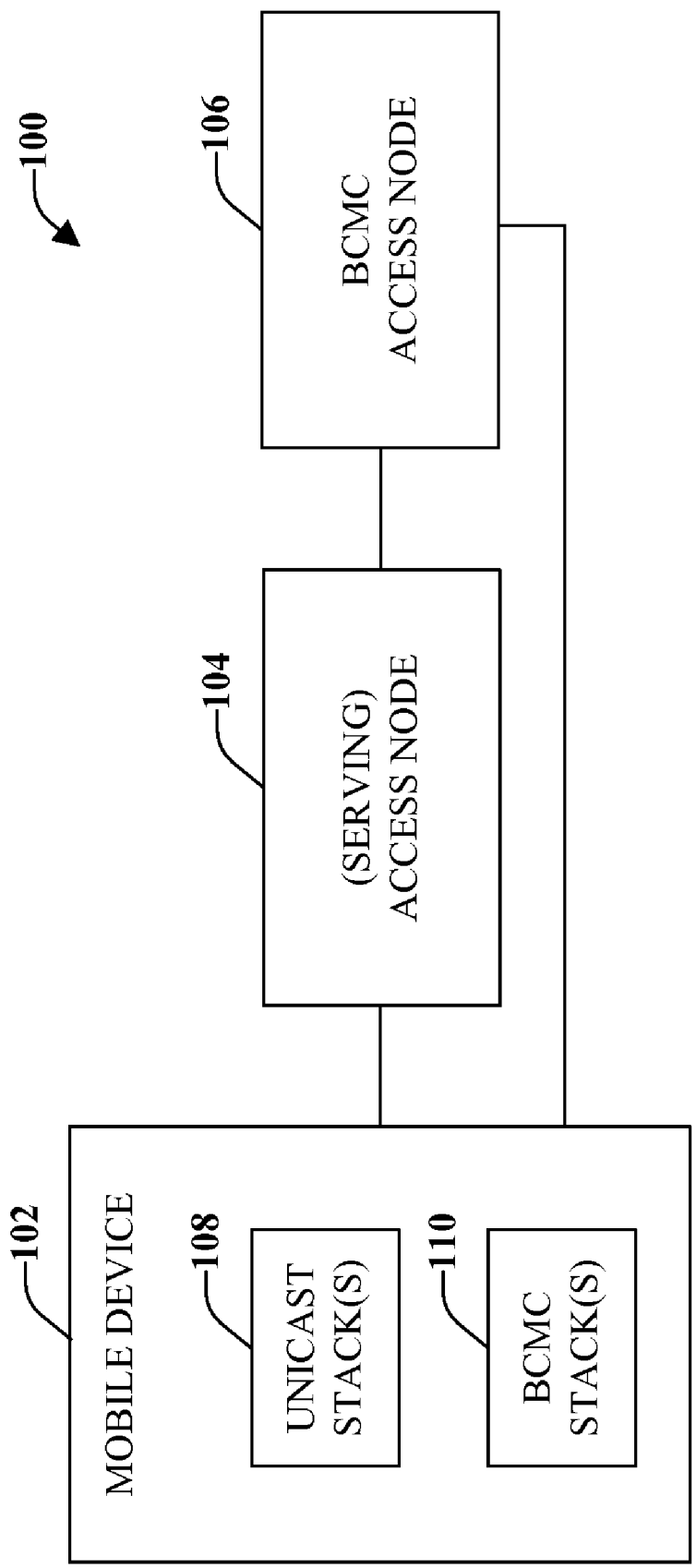
FIG. 1 illustrates a system that facilitates signaling and management of a broadcast-multicast waveform embedded in a unicast waveform.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a system 100 that facilitates signaling and management of a broadcast-multicast waveform embedded in a unicast waveform is illustrated. The unicast waveform can be a multi-route unicast waveform. It should be noted that various aspects will be presented with respect to Ultra Mobile Broadband (UMB) however; the disclosed aspects are not limited to UMB.

System 100 includes a mobile device 102 that is in communication with a serving access node 104 and a broadcast/multicast (BCMC) access node 106. The serving access node 104 includes broadcast channel transmission capability. The serving access node 104 and BCMC access node 106 can be interfaced though an IOS (Inter Operability Specification) interface, for example. Although a number of mobile devices(s) 102 and access node(s) 104 can be included in system 100, as will be appreciated, a single terminal that communicates with a single access node 104 is illustrated for purposes of simplicity.

It should also be noted that the serving access 104 node can be changed (e.g., a different access node can become the serving access node) during operation of mobile device 102. For example, the access point 104 covers a geographic range or cell and, as the mobile device 102 is operated, it may be moved in and out of these geographic cells. To achieve uninterrupted communication the mobile device 102 deregisters with the cell it is exiting and registers with the cell it has entered. The access point 104 might also change depending on various circumstances including the location of mobile device 102, signal strength, quality of the signal, interference within the communications network, as well as other factors.

Mobile device 102 can include one or more unicast stack(s) 108, of which only one is illustrated, and a BCMC stack 110. The number of unicast stack(s) 108 included can be a function of the number of access nodes from which mobile device 102 can be in contact with at any point. For example, if there are three access nodes, the mobile device 102 can include three unicast stacks. However, any number of unicast stacks can be included in mobile device and the determined number is not dependent on the number of access nodes included in any wireless communications network.

The unicast stack(s) 108 and/or BCMC Stack 110 facilitate communication tunneling of out of band signaling of broadcast-multicast waveforms over a unicast waveform. Alternatively or additionally, the unicast stacks 108 can facilitate tunneling multi-user packets of a unicast waveform over a broadcast multicast waveform.

The BCMC Stack 110 can be configured to receive a broadcast/multicast waveform that can be transmitted by serving access node 104 and/or BCMC access node 106. In accordance with some aspects, multiple broadcast/multicast waveforms can be received from multiple access nodes (e.g., serving access nodes and other access nodes whose transmission can be received by mobile device 102). These multiple broadcast/multicast waveforms can be received at the BCMC Stack 108 and combined, increasing signal strength.

A unicast waveform includes a packet destined for a single user or mobile device 102. A multicast waveform includes a packet destined for multiple users, such as all mobile devices within a communications network. However, there might be situations when a serving access node 104 desires to send a packet that is not part of the BCMC protocol to the multiple mobile devices in the network that have BCMC capability (e.g., a BCMC stack). For example, if there is an emergency in the area, access node 104 can be configured to transmit an emergency message to the multiple users at substantially the same time.

System 100 utilizes the multi-route nature of a UMB system or other system. In multi-route, the BCMC protocol has its own route, even though the waveform can be emitted from a similar unicast waveform. Multi-route can provide tunneling of unicast messages though the BCMC waveform, which provides Single Frequency Network (SFN) gains on multi-user packets, such as overhead messages. Multi-route can also facilitate tunneling BCMC message through the unicast waveform.

Further information relating to overlaying a broadcast multicast channel on top of a unicast cellular network is provided with references to the following figures and detailed description.

Figure 2:
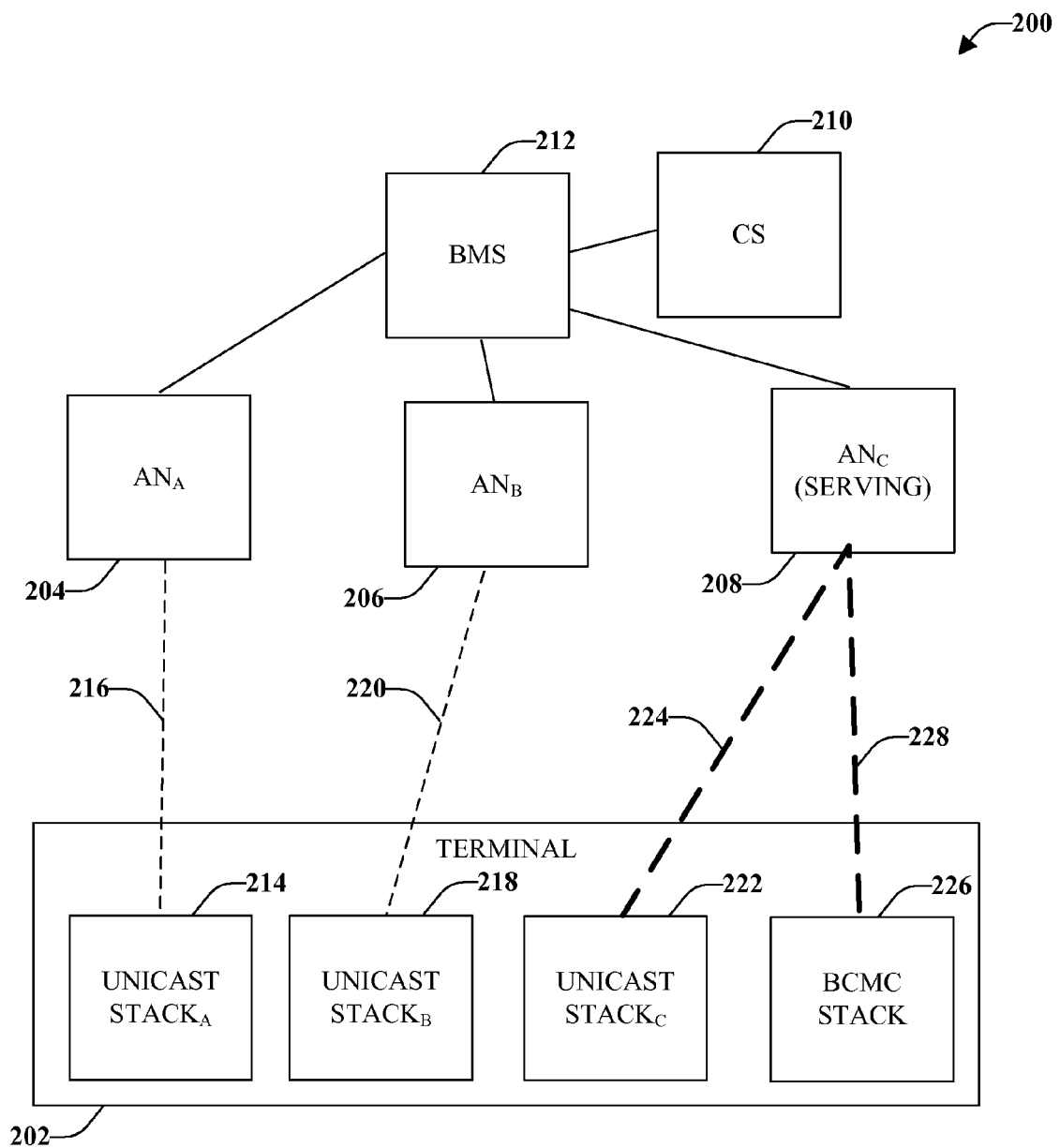
FIG. 2 illustrates a system for managing broadcast-multicast waveforms embedded in a unicast waveform.

FIG. 2 illustrates a system 200 for managing broadcast-multicast waveforms embedded in a unicast waveform. System 200 can facilitate broadcast/multicast (BCMC) operation in a cellular network. Thus, while some packets can be destined to a single terminal or user, other packets can be sent to multiple users by overlaying a broadcast multicast channel on top of the unicast cellular network. There are at least four types of message exchange data made possible by system 200. These types of message exchange data are: the exchange of BCMC higher layer packets; messages generated by protocols in the BMC stack that should be sent on a BCMC channel; messages generated by protocols in the BMC stack that should be sent on a unicast channel; and/or messages generated by protocols in the unicast stack that should be sent on a BCMC channel.

In further detail, system 200 includes a terminal 202 that is in wireless communication with one or more access nodes. It should be noted that multiple terminals 202 can be included in system 200, however only one is shown for purposes of simplicity. Illustrated are three access nodes, labeled $AN_A$ 204, $AN_B$ 206, and $AN_C$ 208, however, it should be noted that more (or fewer) access nodes can be utilized with the disclosed techniques and three are illustrated for purposes of simplicity. Each access node can have unicast and/or broadcast channel transmission capability.

Also included in system 200 are a content server (CS) 210 and a Broadcast Multicast Server (BMS) 212. The CS 210 and BMS 212 are co-network entities that facilitate transmission of a broadcast-multicast waveform embedded in a unicast waveform. The CS 210 sends content (e.g., movie file, audio track, and so forth) to the BMS 212. The BMS 212 multiplies the received content and transmits the multiple content streams to the access nodes 204, 206, 208 (all access network elements) located in (or near) system 200. In turn, each access node 204, 206, 208 transmits the content, which can be selectively received at terminal 202 depending on the entity that sent the content (e.g., the access node identification) and/or the type of content (e.g., unicast, broadcast), the sending node information, as well as other information.

Terminal 202 can include multiple unicast stacks and a single BCMC stack. The content transmitted by $AN_A$ can be received at terminal 202 by Unicast $Stack_A$ 214 though RouteID=A 216. The content transmitted by $AN_B$ 206 can be received by Unicast $Stack_B$ 218 though RouteID=B 220. Similarly, the unicast content transmitted by $AN_C$ 208 can be received by Unicast $Stack_C$ 222 though RouteID=C 224.

Since $AN_C$ 208 is the current serving node, RouteID=C 224 is illustrated in bold. Although $AN_C$ 208 is the serving node for the time captured in FIG. 2, at a next moment in time, the serving node can be switched to another entity and terminal 202 can include a fast switching mechanism to facilitate the switching so that the broadcast stream can be received at the terminal 202.

Each Unicast Stack 214, 218, 222 can be dedicated to receive content from a specific access node 204, 206, 208. Thus, there can be more (or fewer) than three unicast stacks included in terminal 202, which can be considered the subentities within the terminal 202 that communicate with the network elements ($AN_A$ 204, $AN_B$ 206, and $AN_C$ 208). There can be one unicast stack for each open route, however, in accordance with some aspects, a unicast stack can receive packets from multiple routes (or access nodes). Thus, terminal 202 can communicate (e.g., transfer packets) with any of the nodes 204, 206, 208 at any time.

In the illustrated example, $AN_C$ 208, while acting as the serving node, can be transmitting two different waveforms. One waveform is the regular unicast waveform, which is received by Unicast $Stack_C$ 222. The other waveform is the broadcast-multicast (BCMC) waveform that appears at a different network entity to the terminal 202. The entity that receives the BCMC packet is the BCMC Stack 226. The BMC stack 226 corresponds to the BCMC Route 228 and can be assigned special RouteID=0xe.

It should be noted that each access node ($AN_A$ 204, $AN_B$ 206, and $AN_C$ 208) can be transmitting a BCMC waveform over the air. However, in this example, terminal 202 receives the information from $AN_C$ 208. In accordance with some aspects, terminal 202 receives multiple BCMC waveforms from two or more access nodes. The multiple BCMC waveforms are received at the BCMC Stack 226. Each access node is sending a similar BCMC signal, which are combined at the BCMC Stack 226. Thus, the terminal 202 can recognize or receive a stronger signal.

The BMS 212 is the central controller and its functionality can be dependent on the deployment-model, which can be AN-centric and/or region-centric. In either deployment-model the BMS 212 utilizes a Broadcast Multicast Protocol (BMP) to communicate with the terminal(s) 202. In AN-centric mode every access node sends its own BCMC signal. A multicastIP/Port-to-BCMCFlowID can be maintained per access node. In this model BMC 212 is not L2 aware. The AN-centric model does not allow for Single Frequency Network (SFN) operation but does allow for demand based channel lineup at each terminal 202.

In a region-centric model, the multicastIP/Port-to-BCMC-FlowID is maintained regionally. The BMS is L2 aware and can create BCMC Overhead Messages and BCMC data frames. Broadcast Overhead Messages contain static configuration of Broadcast Logical Channels and can be sent as overhead on a unicast stack. The Broadcast Logical Channels can include one or more Broadcast Physical Channels. The region-centric model allows for Space Frequency Network (SFN) operation. Additionally, channel lineup is fixed under the BMS serving area.

Figure 3:
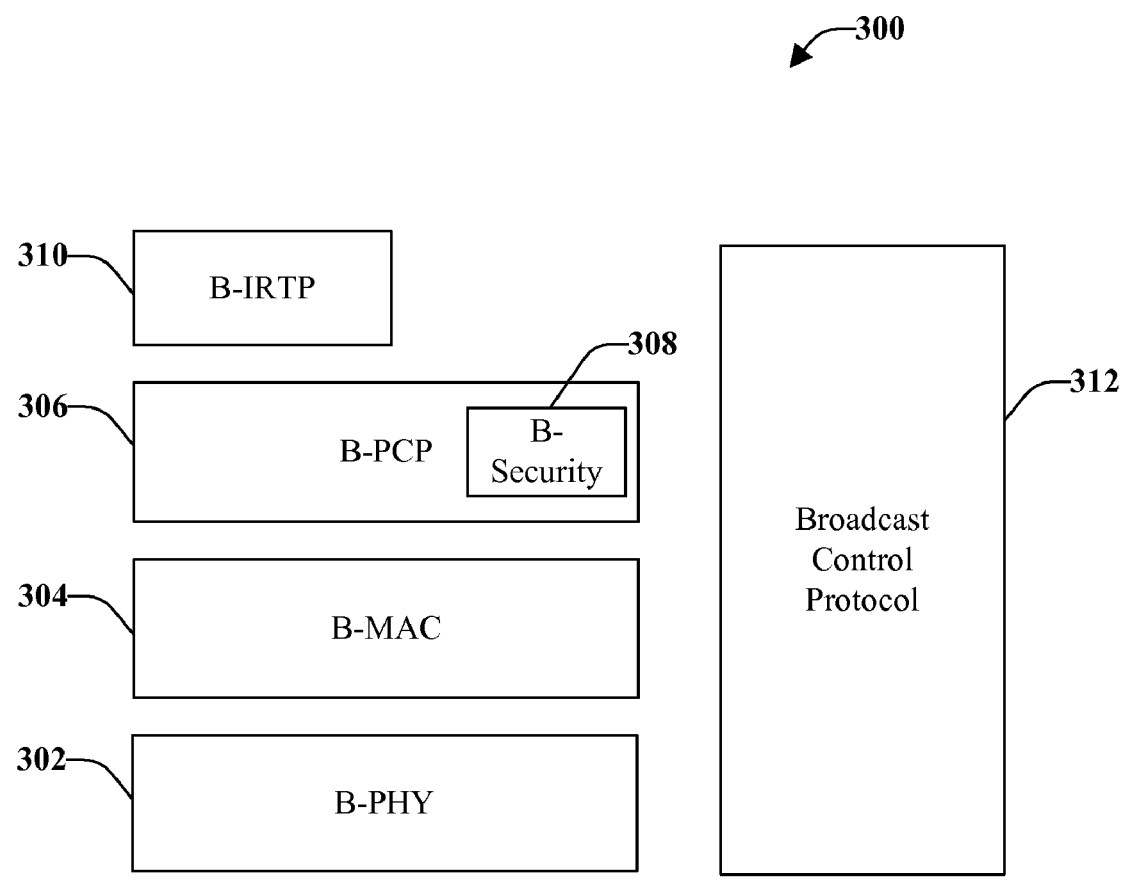
FIG. 3 illustrates a BCMC Protocol Stack.

FIG. 3 illustrates a BCMC Protocol Stack 300. The BCMC Protocol Stack 300 can be included on a terminal or other communications devices to facilitate communication of a Broadcast-Multicast waveform in accordance with the disclosed aspects. Included in the stack 300 is a BCMC Physical Channel Protocol (B-PHY) 302. The B-PHY can include the F-PICH (Broadcast Pilot Channel) and the F-BCMCSCH (Broadcast/Multicast Services Channel). Also included in the BCMC Protocol Stack 300 is a BCMC MAC Channel Protocol (B-MAC) 304. A BCMC Packet Consolidation Protocol (B-PCP) 306 is also included. The B-PCP 306 facilitates framing and multiplexing of higher layer packets. The B-PCP 306 can also perform encryption of BCMC content packets, which can be facilitated by a B-Security module 308.

The BCMC Protocol Stack 300 also includes a BCMC Inter-Route Tunneling Protocol (B-IRTP) 310 that tunnels packets generated by the unicast stack on the BCMC Physical Channel. Also included is a BCMC Control Protocol 312, which defines control procedures, such as BCMC Flow Registration.

Figure 4:
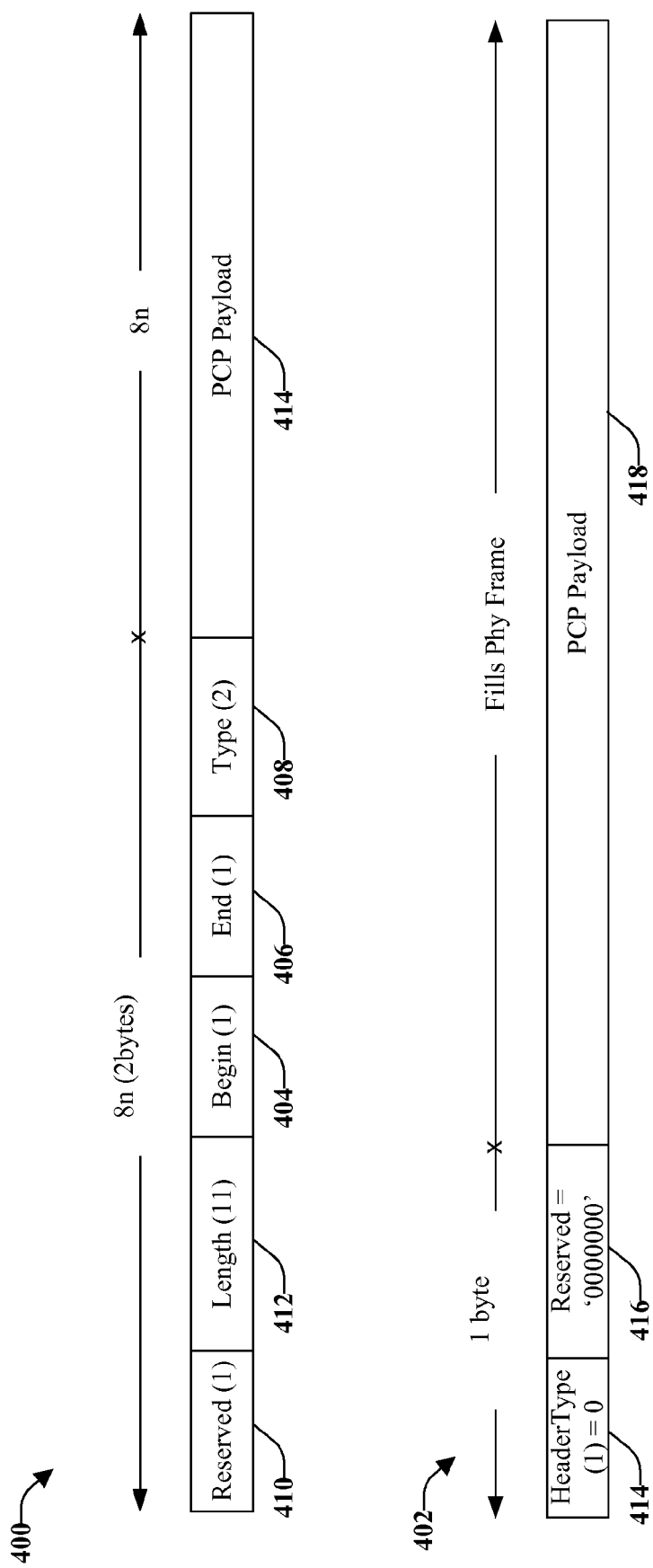
FIG. 4 illustrates a BCMC Packet Consolidation Protocol (B-PCP).

With reference now to FIG. 4, illustrated is the BCMC Packet Consolidation Protocol (B-PCP) 400. The concept behind the BCMC Packet Consolidation Protocol (PCP) is that there might be a number of messages or packets that are to be sent over the BCMCS waveform. The BCMC generally transmits the messages or packets at predetermined intervals. Therefore, a packet is not sent whenever the data is available but is sent at the next sending interval. Thus, more than one packet should be included in the BCMCS PHY packet to mitigate wasting resources. The PCP can facilitate inclusion of multiple packets in a MAC packet.

Two different B-PCP are illustrated at 400 and 402, each having a different header. The B-PCP 400, 402 performs framing of higher layer packets and can perform fragmentation, if necessary. The B-PCP 400 can indicate a boundary of higher layer packets though utilization of a Begin Flag 404 and an End Flag 406. The Begin Flag 404 indicates whether it is a first fragment of a higher layer packet. The End Flag 406 indicates whether it is a last fragment of a higher layer packet.

The B-PCP 400 can be multiplexed into three types of packets by an indication provided in the Type Field 408. These packet types are: Broadcast Content Packets; Unicast Packets; and Signaling Messages. Broadcast Content Packets can call a security function to encrypt Broadcast Content Packets. Unicast Packets to be tunneled can be received from Broadcast Inter-Route Tunneling Protocol (B-ITRP). Signaling Messages can be generated by protocols in the BCMC Suite that are destined for transmission on the Broadcast Physical Channel. The Type Field 408 can indicate 00: Broadcast Content Packet (in the clear); 01: Broadcast Content Packet (encrypted); 10: Broadcast IRTP Packet; and/or 11: Message of a Broadcast Protocol. Also included in the B-PCP 400 is one or more Reserved Blocks 410. Another field 412 indicates the Length of the PCP payload 414.

B-PCP 402 illustrates a different header that can be utilized with the disclosed aspects. B-PCP 402 includes a HeaderType Field 414 and a Reserved Field 416. These fields 414 and 416 can be approximately one byte in length. Also included is a Payload 418.

The BCMC MAC protocol can include an Error Control Block that can consist entirely of the Broadcast Packet Consolidation Protocol Packet, which can mitigate the need for a Block Header. The First B-PCP packet in each Error Control Block should be the packet containing the SecurityParameters message from the Broadcast Security Protocol. This packet contains the RandomSeed utilized to generate the Short Term Key. Each Error Control Bock should begin with a new B-PCP packet.

In accordance with some aspects, a Broadcast Overhead Channel can be transmitted as overhead on each Error Control Block. The Broadcast Overhead Channel can provide finer multiplexing of different BCMC content data.

BCMC Signaling Messages can be generated by BCMC Protocols. The BCMC Signaling Messages can be transmitted on the Broadcast Physical Channel and/or the Physical Channel of the Unicast Stack. If transmitted on the Physical Channel of the Unicast Stack, the BCMC Signaling Messages can be tunneled through IRTP of the serving unicast Route.

Forward Link (FL) Messages can be transmitted using either the Broadcast Physical Channel method or the Physical Channel of the Unicast Stack method. The actual method to be utilized for each method can be predetermined, such as by a standard or other means. Reverse Link (RL) Messages can be tunneled through the Unicast Stack.

A MessageID space can be shared among all protocols in the BCMC Suite. A SNP header with Type field to specify the protocol might not be needed. The Type filed in the B-PCP header can indicate whether it is a BCMC signaling message. Messages/packets generated by the unicast stack can also be transmitted on the Broadcast Physical Channel. These messages/packets can be tunneled through a B-IRTP of the BCMC stack.

Figure 5:
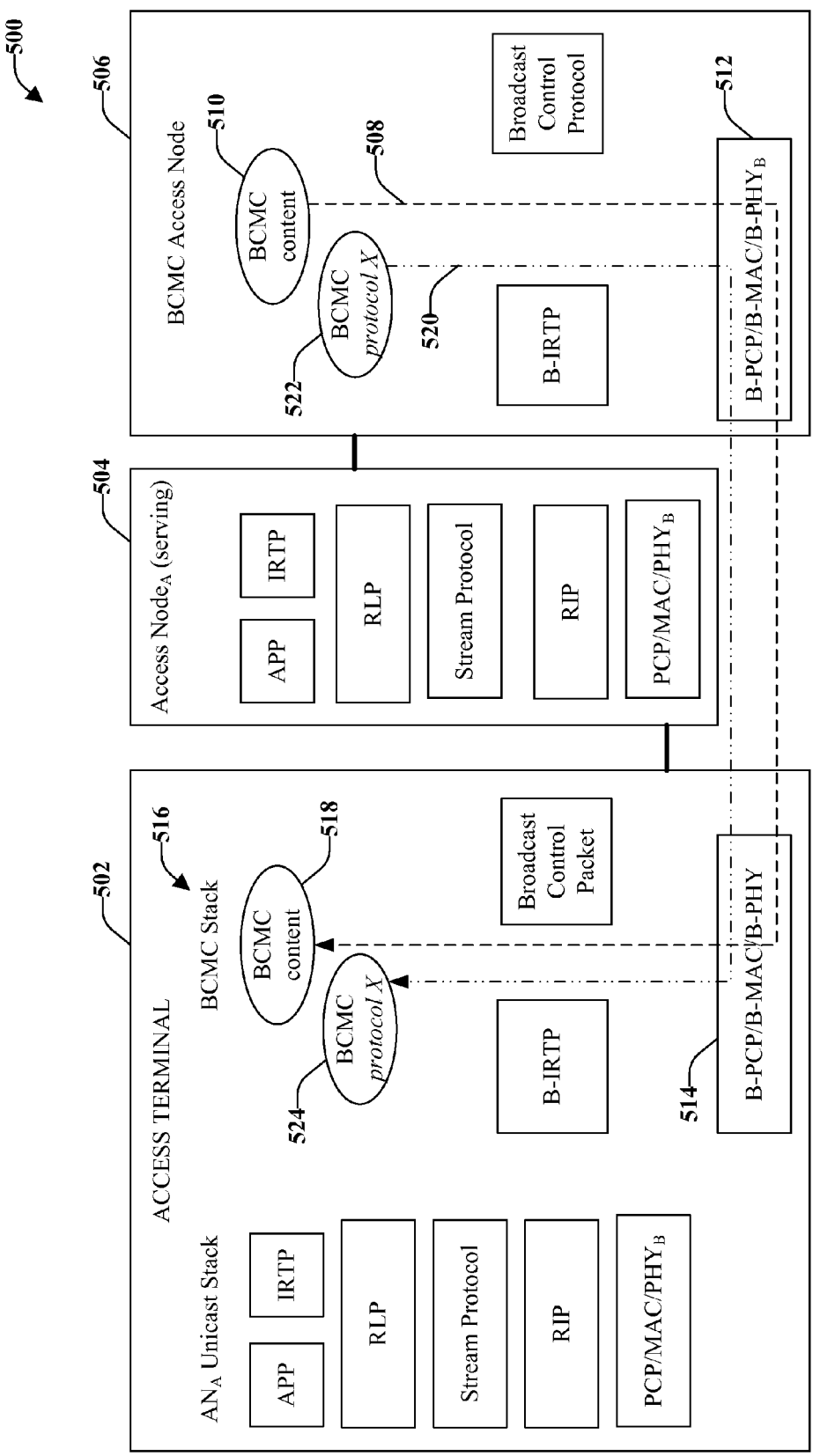
FIG. 5 illustrates a system with exemplary BCMC data paths for signaling and management of a broadcast-multicast waveform embedded in a unicast waveform.

FIG. 5 illustrates a system 500 with exemplary BCMC data paths for signaling and management of a broadcast-multicast waveform embedded in a unicast waveform. The data paths illustrate how packets are exchanged between an access terminal 502 and an access node 504, which is the access node 504 serving the access terminal 502 at this time. System 500 also includes a BCMC Access Node 506, which is similar to the BMS 212 illustrated in FIG. 2. The Access Node 504 and BCMC Access Node 506 can be connected through an IOS interface.

A BCMC Data Path for BCMC higher layer packets is illustrated at 508. A BCMC content generator 510, located in the BCMC Access Node 506, sends the BCMC higher layer packets. The packets are sent through the B-PCP/B-MAC/P-PHY 512 of the BCMC Access Node 506 and over the air to the access terminal (e.g., air interface). The packets are received at the B-PCP/B-MAC/P-PHY 514 located in the BCMC Stack 516 of the Access Terminal 502 and forwarded to a BCMC content receiver 518 of the terminal 502. A path similar to the BCMC Data Path for BCMC higher layer packets 508 is utilized for wireless communications.

A BCMC Data Path for messages generated by protocols in the BCMC stack that are to be sent on a BCMC channel is illustrated at 520. This path 520 is the protocol for generating a signaling message, which can be one of multiple types of signaling messages. Thus, the protocol creates a signaling messages that is intended for all access terminals within a region, and therefore, should be transmitted over the BCMC channel. A BCMC protocol X 522 of the BCMC Access Node

506 sends the packet over the B-PCP/B-MAC/P-PHY 512 of the BCMC Access Node 506 and over the air. The packet is received at the B-PCP/B-MAC/P-PHY 514 located in the BCMC Stack 516 of the Access Terminal 502 and forwarded to a BCMC protocol X 524 of the terminal 502. The access terminal 502 performs the necessary functions depending on the information contained in the signal.

Thus, the BCMC Data Path for BCMC higher layer packets 508 and the BCMC Data Path for messages generated by protocols in the BCMC stack that are to be transmitted on a BCMC channel 520 are transmitted over the air interface from the BCMC Access Node 506 directly to the Access Terminal 502. Thus, these Data Paths 508 and 520 can bypass the (Serving) Access Node 504.

Figure 6:
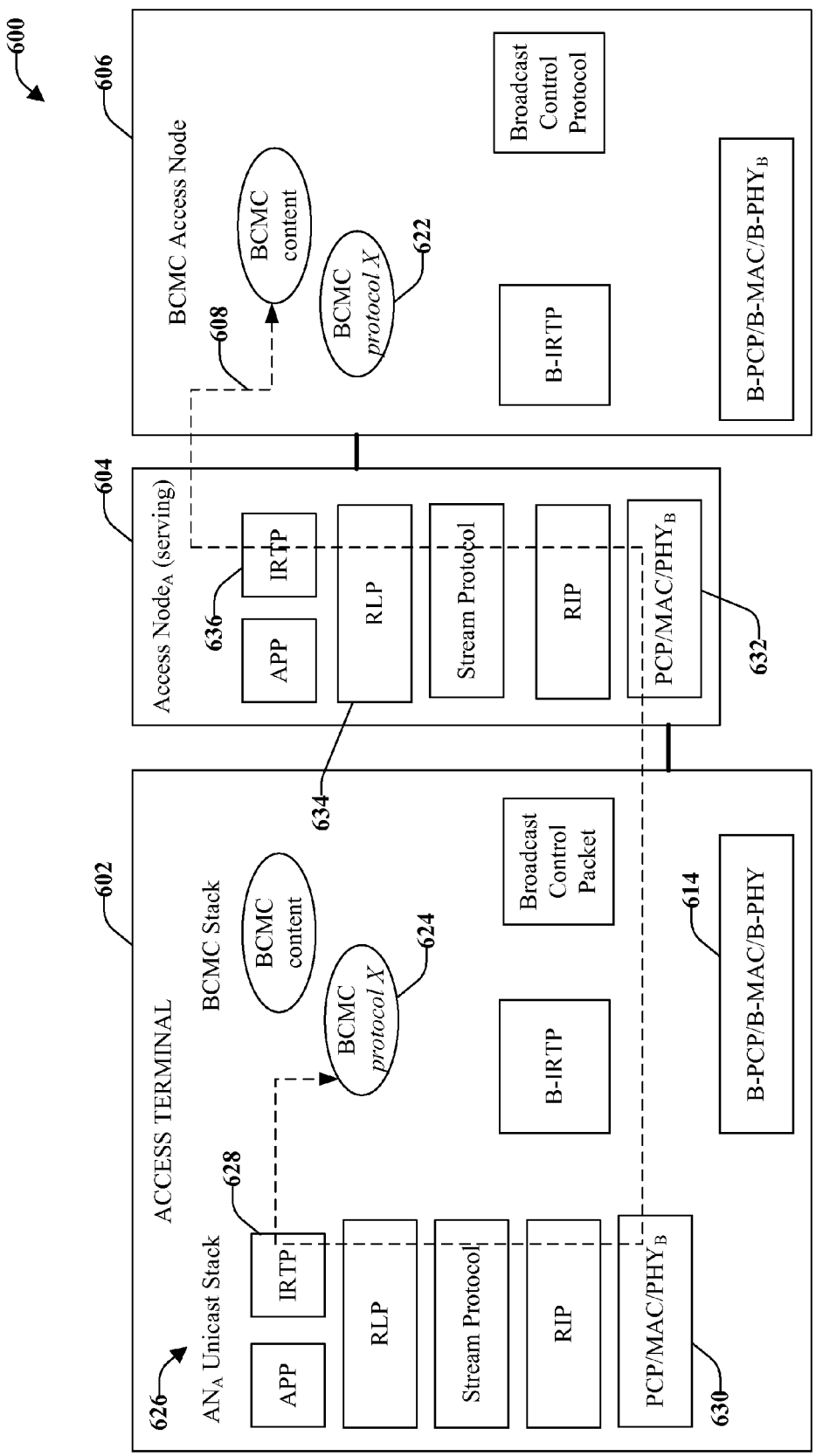
FIG. 6 illustrates a system that facilitates tunneling of out of band signaling of a broadcast-multicast waveform over a unicast waveform.

FIG. 6 illustrates a system 600 that facilitates tunneling of out of band signaling of a broadcast-multicast waveform over a unicast waveform. The BCMC protocol messages sent over the BCMC Data Path 608 are those messages that are to be sent to and/or from a single access terminal 602. A BCMC protocol X 622 located in a BCMC Access Node 606 and/or a BCMC protocol X 624 located in the Access Terminal 602 can be configured to generate messages that need to be sent on a unicast channel. These messages are specifically directed to/from individual access terminals 602 and can include information such as that an access terminal (e.g., user) wants to listen to a particular channel and has registered for that channel. Even though these messages are sent using the unicast stack, the messages can be sent using Broadcast MACID to facilitate multiple users receiving the same message. These messages can contain information about the structure of the BCMCS waveform, which can allow the Access Terminal to receive the BCMCS physical channel.

A BCMC protocol X 624, located in the Access Terminal 602 can generate a packet. Since BCMC physical layer cannot be used in a reverse direction, such packets are sent over an $AN_A$ Unicast Stack 626, located in the Access Terminal 602. The BCMC protocol X 624 generates the packet and sends the packet though a BCMC Inter-Route Tunneling Protocol (IRTP) 628. The message is then transmitted though the PCP/MAC/PHY$_B$ 630 of the $AN_A$ Unicast Stack 626 and transmitted over the air as unicast. The message is received at the PCP/MAC/PHY$_B$ 632 of Access Node$_A$ (serving node) 604. The message is processed though an RLP 634 and an IRTP 636 of Access Node$_A$ 604. The message is recognized as belonging to the BCMC protocol X 622 of the BCMC access node 606, where the message is received over an IOS interface. If the messages are generated by the BCMC AN 606, a similar path, in the reverse order, is utilized.

Figure 7:
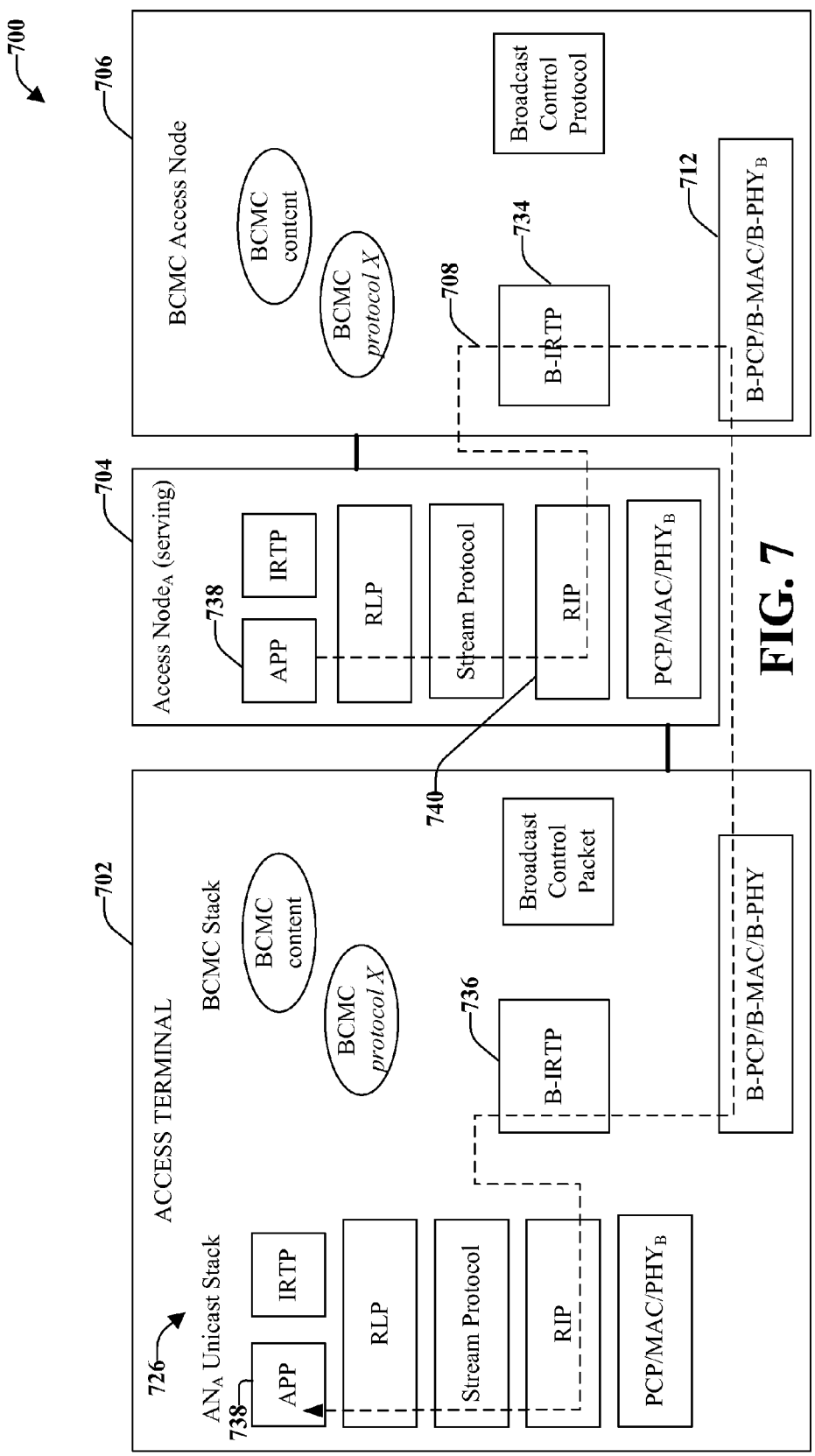
FIG. 7 illustrates a system that facilitates tunneling multi-user packets of a unicast waveform over a broadcast-multicast waveform.

FIG. 7 illustrates a system 700 that facilitates tunneling multi-user packets of a unicast waveform over a broadcast-multicast waveform. There might be situations when a serving access node wants to send a packet that is not a BCMC packet to multiple terminals in the network. The multiple terminals that have a BCMC stack can receive this packet. An example of a message that might be sent in this manner is a message indicating that there is an emergency (e.g., flash flood in the area) and everyone within the area should receive the message.

The BCMC Data Path for messages generated by protocols in the unicast stack that should be sent on the BCMC channel is illustrated at 708. The message is generated by an application 738 associated with the (Serving) Access Node 704. The application can be an SMS application or other application. The message is sent though the protocol (RIP 740) of the (Serving) Access Node 704 and though the B-IRTP 734 of the BCMC access node 706. The message is routed through the B-PCP/B-MAC/B-PHY 712 and all access terminals in the region receive the message over an air interface.

A header included in the message contains information indicating that, the message should go to the B-IRTP 736 of the Access Terminal. The B-IRTP 736 recognizes that the message should be routed to the unicast stack 726. The message arrives at the application 738 of the access terminal 702, which can be an SMS application or another application that receives the packets and presents the packets in a perceivable format.

Figure 8:
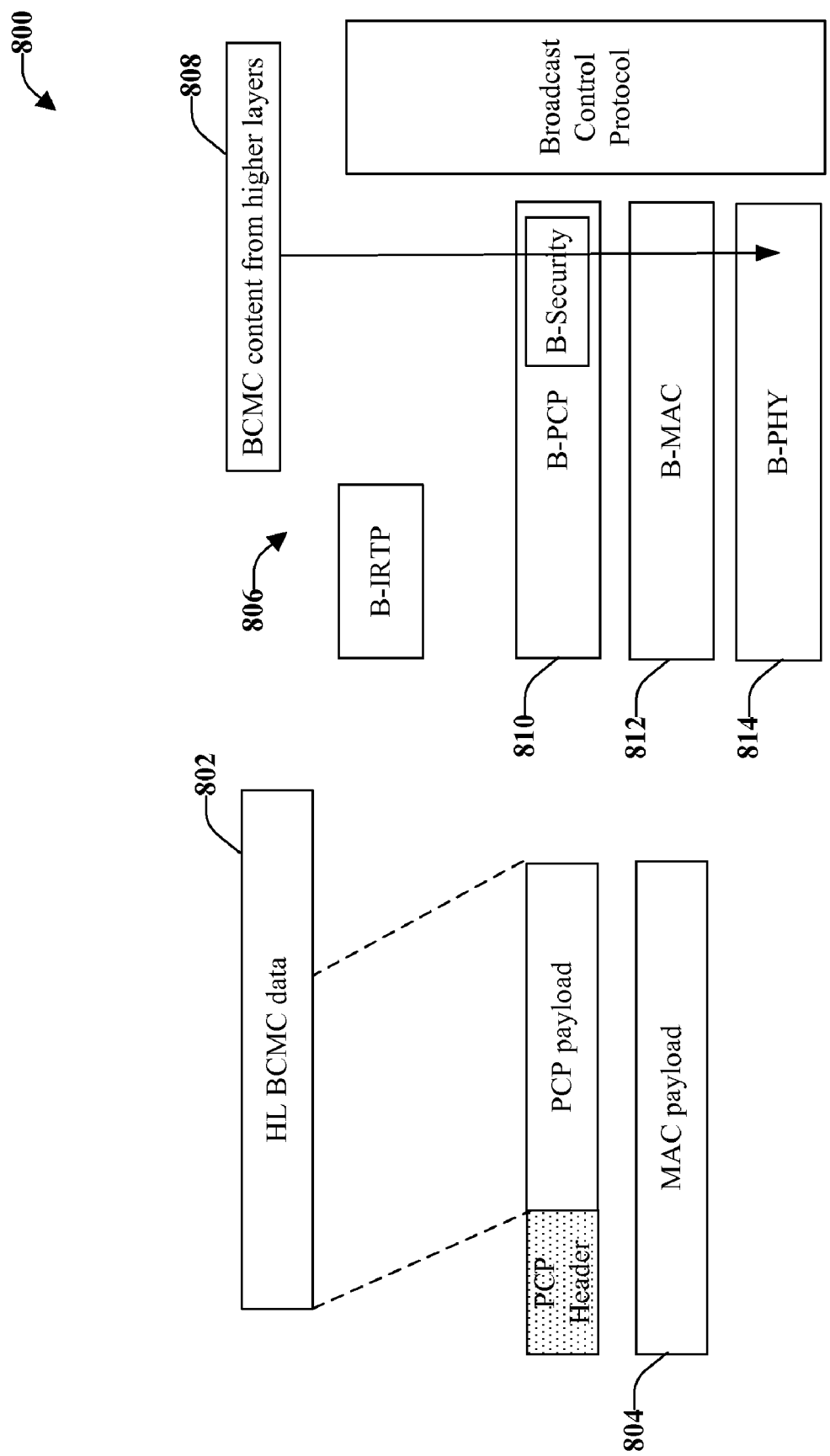
FIG. 8 illustrates a schematic representation of BCMC content.

With reference now to FIG. 8, illustrated is a schematic representation of BCMC content 800. The figure on the left illustrates a High Level (HL) BCMC data 802 that can be fragmented if the entire packet does not fit in the MAC payload 804. The figure on the left illustrates the packet traversing the BCMC Protocol Stack 806. The BCMC content for higher layers 808 traverses through B-Security 810, then B-MAC 812, then B-PHY 814.

Figure 9:
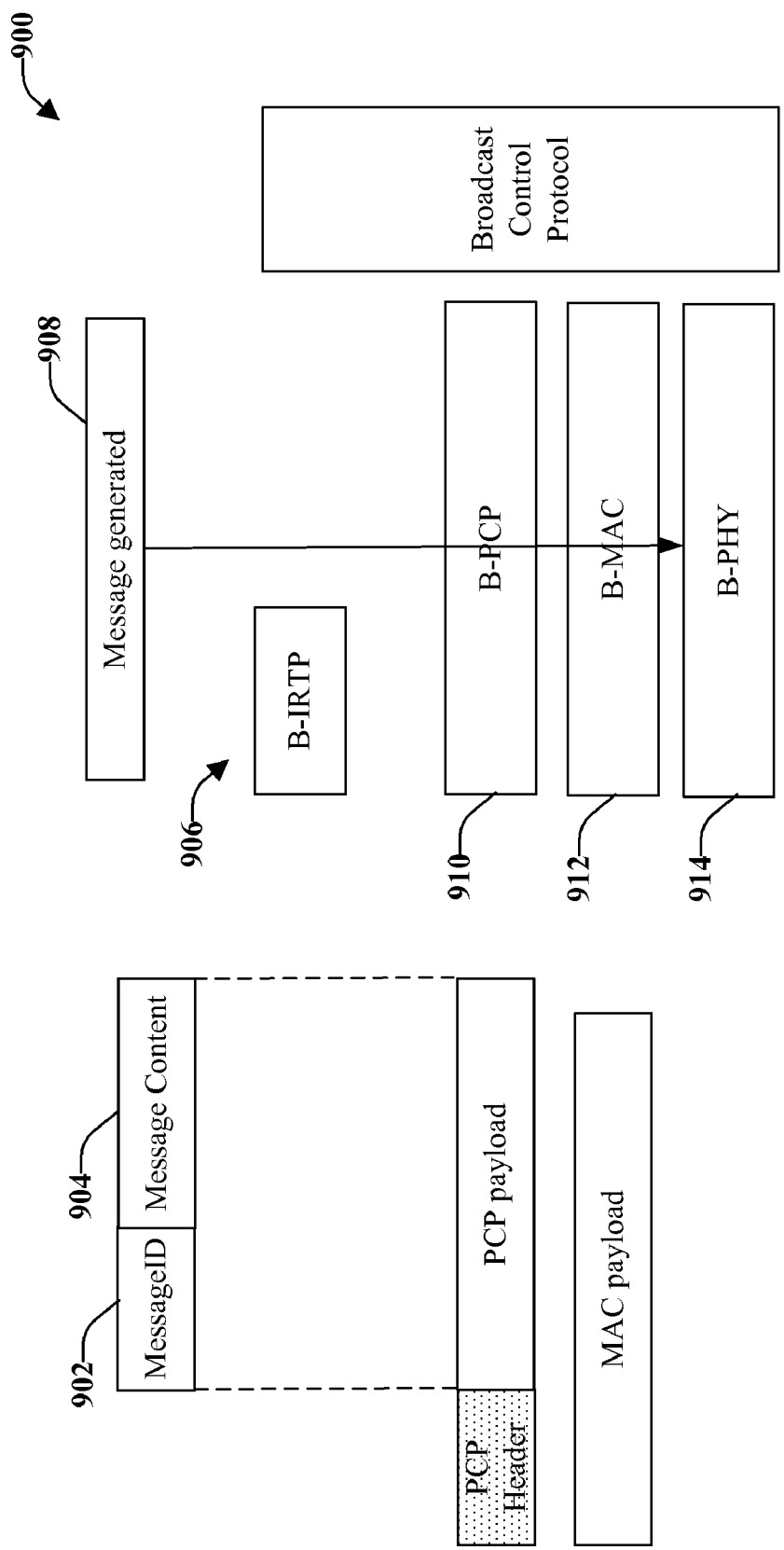
FIG. 9 illustrates a schematic representation of BCMC messages transmitted on a BCMC channel.

FIG. 9 illustrates a schematic representation of BCMC messages transmitted on a BCMC channel 900. BCMC messages can include a MessageID 902 and Message Content 904. A message generated by protocols in the BCMC stack that should be sent on the BCMC channel is illustrated at 908. An example of this type of message is a BCMCSecurityParameters message. The messages 908 traverse trough B-PCP 910, B-MAC 912, and B-PHY 914 of the BCMC Stack 906. This message does not go though B-Security (not illustrated).

Figure 10:
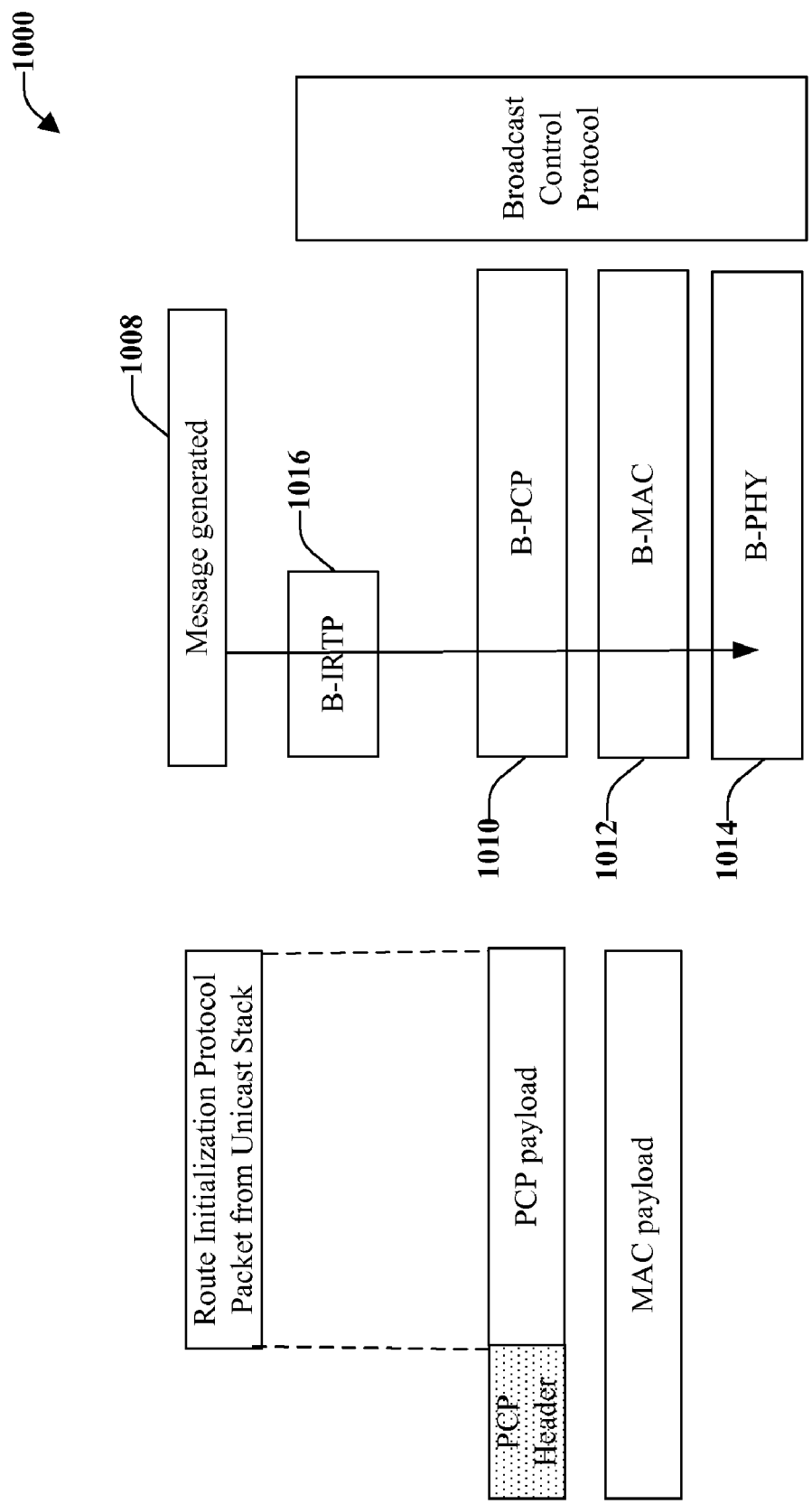
FIG. 10 is a schematic representation of a unicast message transmitted on a BCMC channel.

Illustrated in FIG. 10 is a schematic representation of a unicast message transmitted on a BCMC channel 1000. Messages generated by protocols in the unicast stack that should be send on a BCMC channel are illustrated at 1008. These messages 1008 traverse the B-IRTP 1016, B-PCP 1010, B-MAC 1012, and B-PHY 1014.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 11:
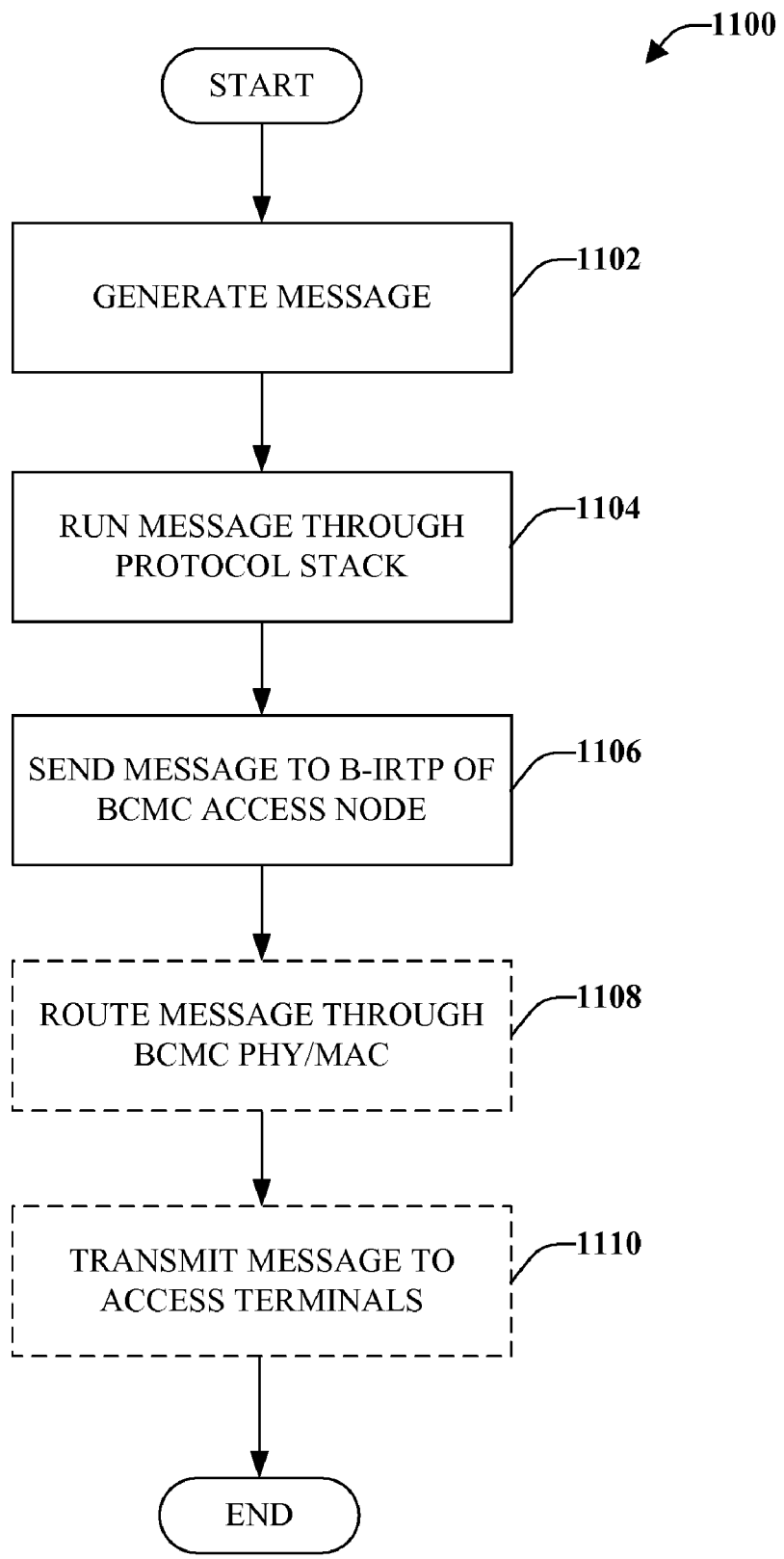
FIG. 11 illustrates a method to tunnel multi-user packets of a unicast waveform over a broadcast waveform.

FIG. 11 illustrates a method 1100 to tunnel multi-user packets of a unicast waveform over a broadcast waveform. These packets can include information that is not normally included in a broadcast waveform but should be sent to as many devices as possible within a communications network. Examples of such packets can include emergency messages or other messages that would be beneficial to a large group of users within a particular geographic area. It should be noted that these messages can be received by any device that has a BCMCS stack (e.g., capability of receiving BCMC waveform) within the serving area (e.g., communications network).

At 1102, a message that should be transmitted over a BCMC channel is generated though utilization of protocols in a unicast stack of the serving access node. These messages can be identified as having a priority level that exceeds a threshold level or based on some other criteria (e.g., key words or key phrases within a subject or body of a message). After the message is generated, at 1104, it is process through a protocol stack of the serving access node.

The message is sent over the air, at 1106, to a B-IRTP of a BCMC access node serving the communications network. The B-IRTP tunnels packets generated by the unicast stack on the BCMC Physical Channel. At the BCMC Access Node, method 1100 continues, at 1108, with the message being routed through the BMCC B-PCP/B-MAC/B-PHY. The message is transmitted over the air, at 1110, to the mobile devices within the communications network.

Figure 12:
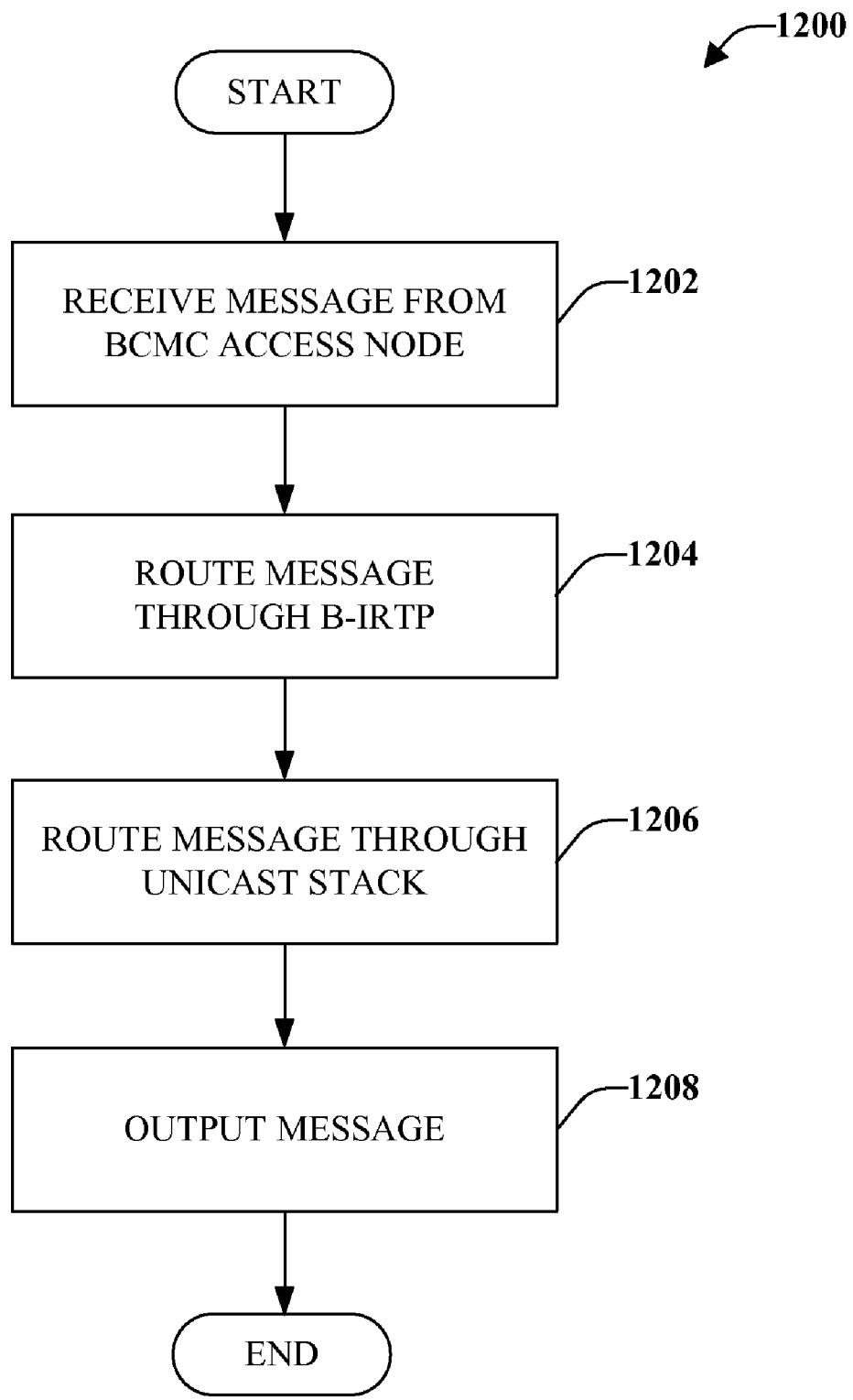
FIG. 12 illustrates a method for receiving messages generated by protocols in the unicast stack that are transmitted on a BCMC channel.

FIG. 12 illustrates a method 1200 for receiving messages generated by protocols in the unicast stack that are transmitted on a BCMC channel. These messages can be transmitted utilizing the method of the above figure.

At 1202, messages are received from a BCMC Access Node. These messages can include information that is usually included in a broadcast waveform but should be sent to as many devices as possible within a communications network. The messages can be received at a B-PCP/B-MAC/P-PHY of the access terminal.

At 1204, a header included in the messages is identified and, based on the header information, the messages are routed through the B-IRTP protocol of the access terminal. The B-IRTP protocol can review information contained within the message and recognize that the message should be routed through the unicast stack of the access terminal, at 1206.

The message is output to the user, at 1208. The message can be output though an application, such as an SMS application or other applications that can receive the packet and present the packet to the user. The packet can be presented on a screen display or though other readily perceivable means, such as audio, for example.

Figure 13:
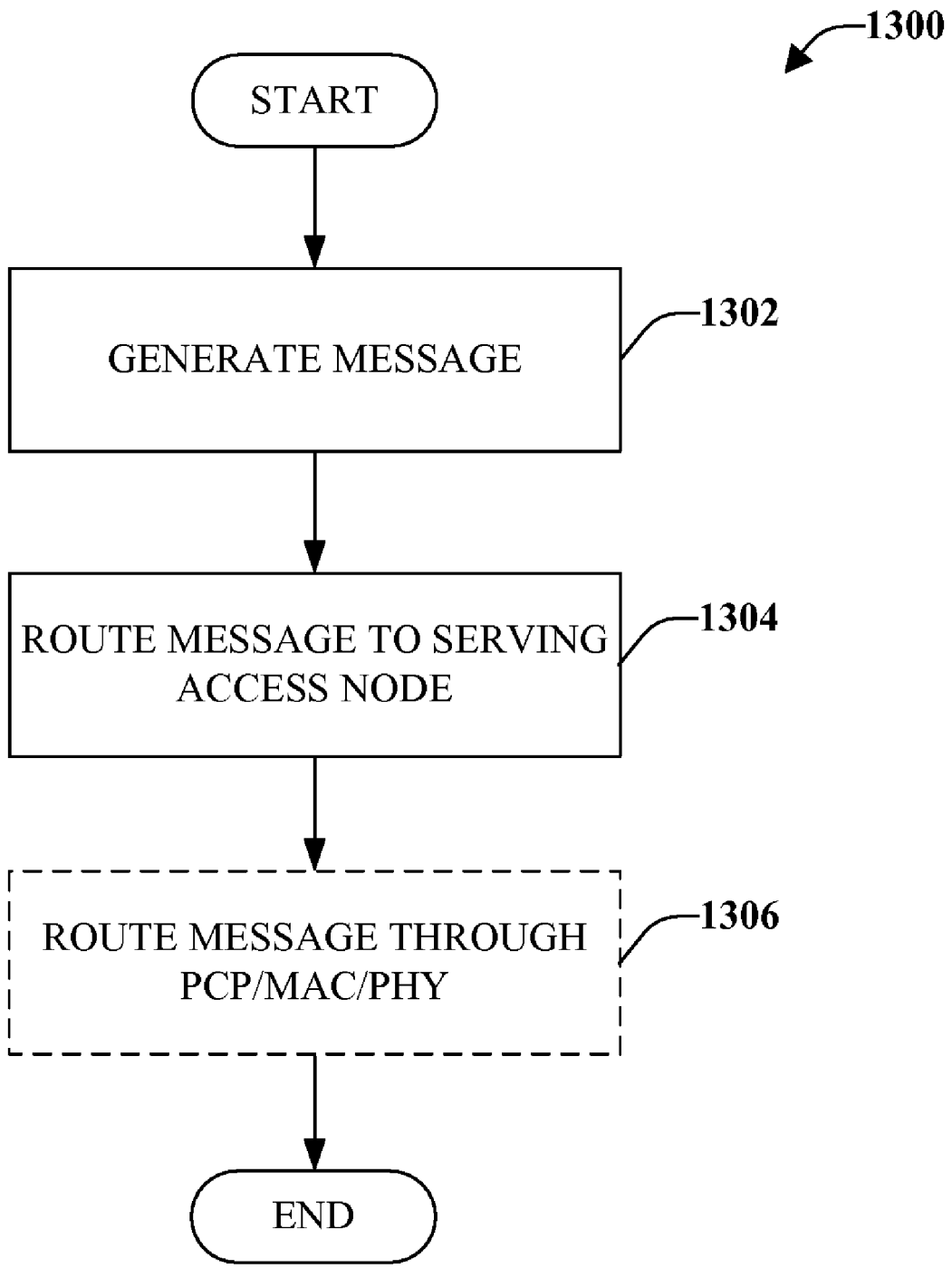
FIG. 13 illustrates a method to tunnel out of band signaling of a broadcast-multicast waveform over a unicast waveform.

With reference now to FIG. 13, illustrated is a method 1300 to tunnel out of band signaling of a broadcast-multicast waveform over a unicast waveform. Method 1300 can facilitate transmitting BCMC protocol messages to a single access terminal. Since all the devices in the communications network do not need to receive the messages, it does not need to be sent over the BCMC PHY layer.

Method 1300 starts, at 1302, when a message is generated in the BCMC protocol X of a BCMC Access Mode. This message, instead of being routed though the B-PCP/B-MAC/P-PHY, is routed over the air to the serving access node, at 1304.

The serving access node receives the packet at the IRTP. Method 1300 continues, at 1306, when the access node routes the message though the PCP/MAC/PHY$_B$. The message is sent over the air, as a unicast message to the mobile device that is to receive the message.

Figure 14:
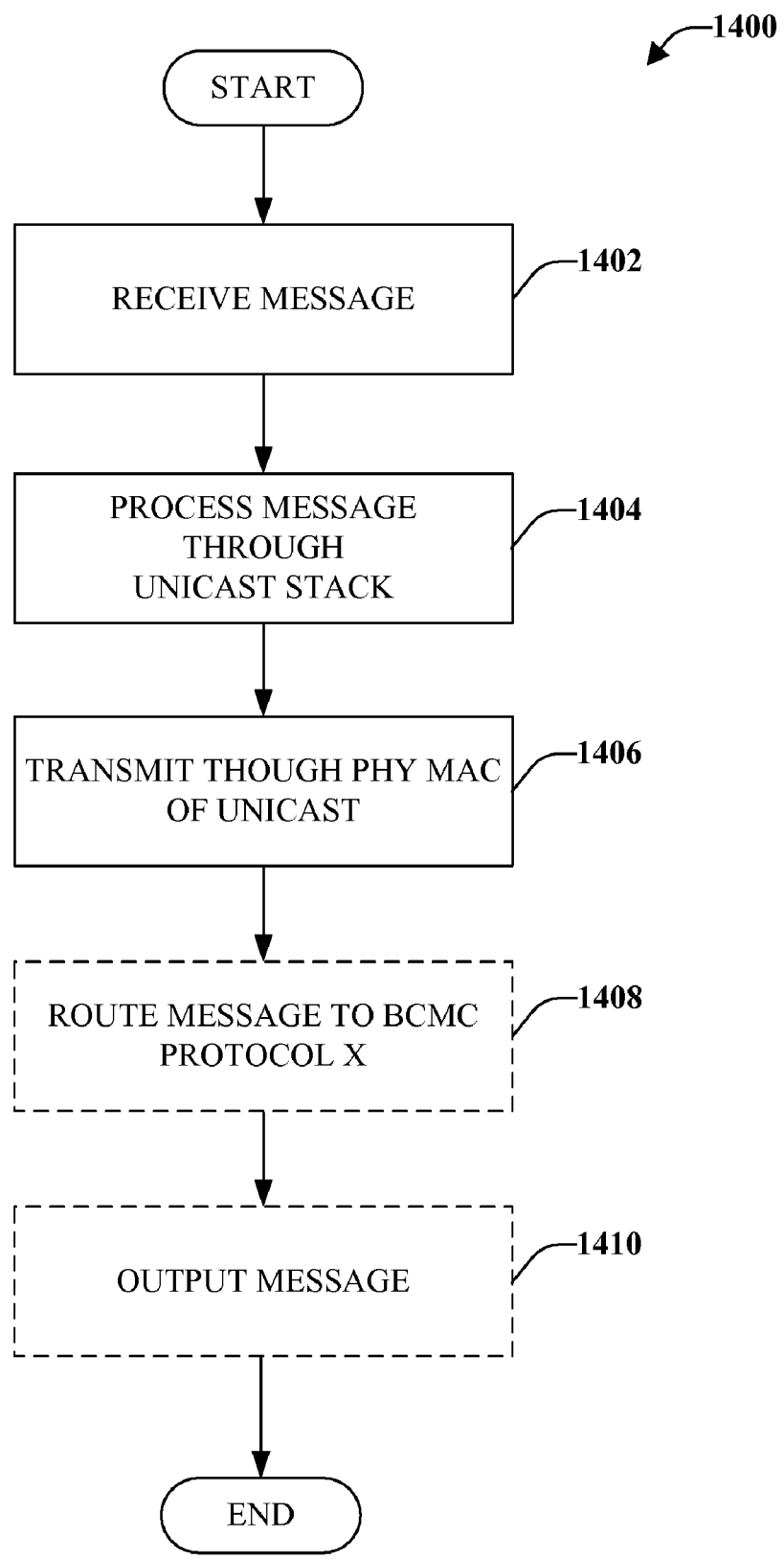
FIG. 14 illustrates another method to tunnel an out of band signaling of a broadcast-multicast waveform over a unicast waveform.

FIG. 14, illustrates another method to tunnel an out of band signaling of a broadcast-multicast waveform over a unicast waveform. Method 1400 starts, at 1402, when a message is received from the serving access node. This message can be received at a PCP/MAC/PHY$_B$. The message is routed through the Unicast Stack, at 1404. Even though the message includes a broadcast-multicast waveform, it is routed through the unicast stack because the message was tunneled over the unicast waveform, as described with reference to FIG. 13. Based on a header contained in the message, it is routed to the BCMC protocol X, at 1406. The message is output to the user, at 1406, in any perceivable manner.

Figure 15:
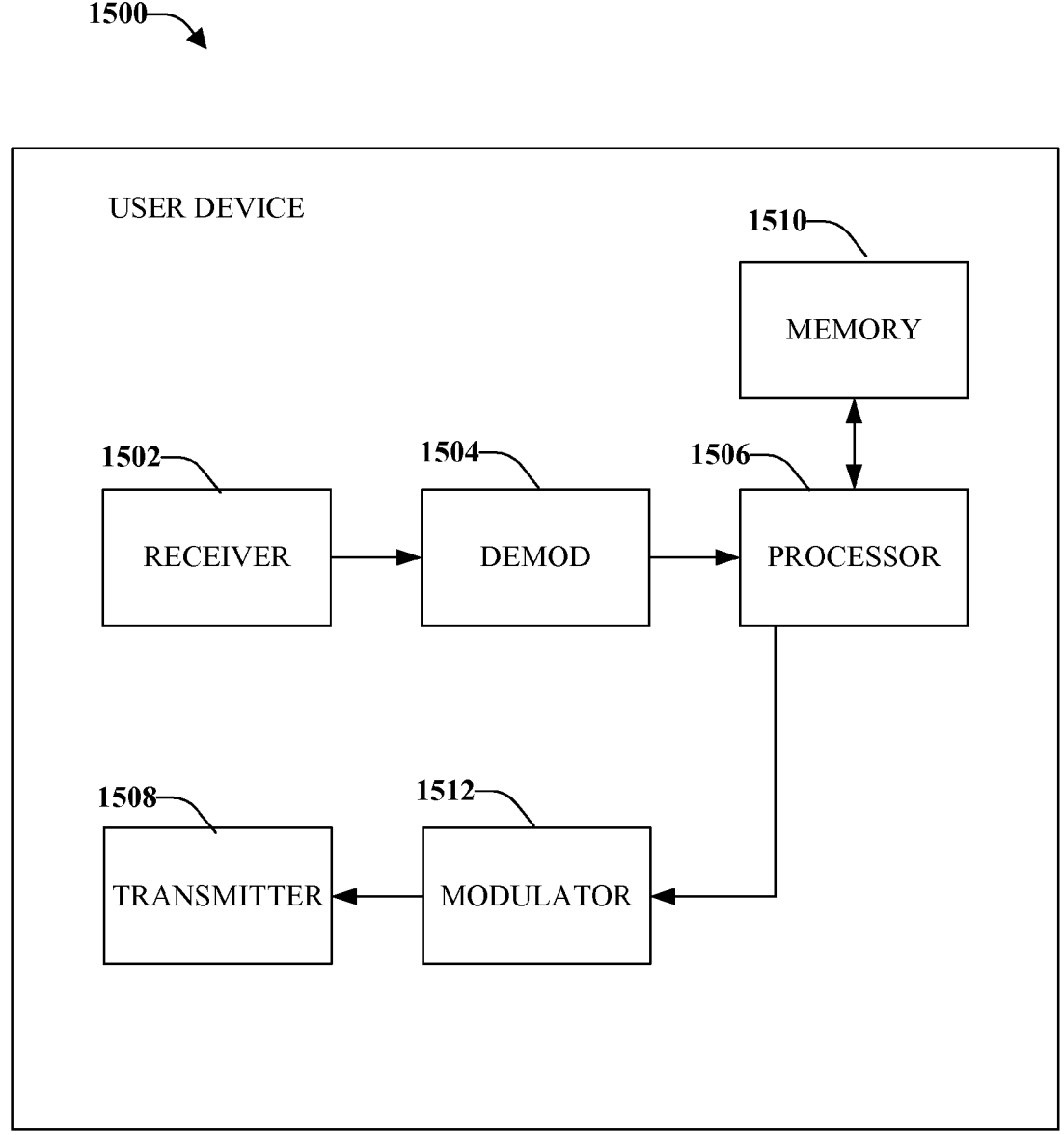
FIG. 15 illustrates a system that facilitates signaling and management of a broadcast-multicast waveform embedded in a unicast waveform in accordance with one or more of the disclosed aspects.

With reference now to FIG. 15, illustrated is a system 1500 that facilitates signaling and management of a broadcast-multicast waveform embedded in a unicast waveform in accordance with one or more of the disclosed aspects. System 1500 can reside in an access point and/or in a user device. All the sub-blocks of system 1500 can be present in both the access point and the user device for the unicast waveform. However, for the BCMC waveform, the user device can contain transmitter related sub-blocks (1508 and 1512) and the access point can contain receiver related sub-blocks (1502 and 1504). System 1500 comprises a receiver 1502 that can receive a signal from, for example, a receiver antenna. The receiver 1502 can perform typical actions thereon, such as filtering, amplifying, downconverting, etc. the received signal. The receiver 1502 can also digitize the conditioned signal to obtain samples. A demodulator 1504 can obtain received symbols for each symbol period, as well as provide received symbols to a processor 1506.

Processor 1506 can be a processor dedicated to analyzing information received by receiver component 1502 and/or generating information for transmission by a transmitter 1508. In addition or alternatively, processor 1506 can control one or more components of user device 1500, analyze information received by receiver 1502, generate information for transmission by transmitter 1508, and/or control one or more components of user device 1500. Processor 1506 may include a controller component capable of coordinating communications with additional user devices.

User device 1500 can additionally comprise memory 1508 operatively coupled to processor 1506 and that can store information related to coordinating communications and any other suitable information. Memory 1510 can additionally store protocols associated with coordinating communication. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 1508 of the subject systems and/or methods is intended to comprise, without being limited to, these and any other suitable types of memory. User device 1500 can further comprise a symbol modulator 1512 and a transmitter 1508 that transmits the modulated signal.

In accordance with some aspects, memory 1510 can be configured to retain and processor 1506 can be configured to execute instructions relating to receiving a message over a broadcast-multicast waveform and tunneling the message though a B-IRTP. The instructions can also relate to routing the message though a unicast stack, and outputting the message to a user. In accordance with other aspects, memory 1510 can be configured to retain and processor 1506 can be configured to execute instructions relating to receiving a message over a unicast waveform and processing the message through a unicast stack. The instructions can also relate to routing the message to a broadcast/multicast (BCMC) stack and outputting the message to a user.

Figure 16:
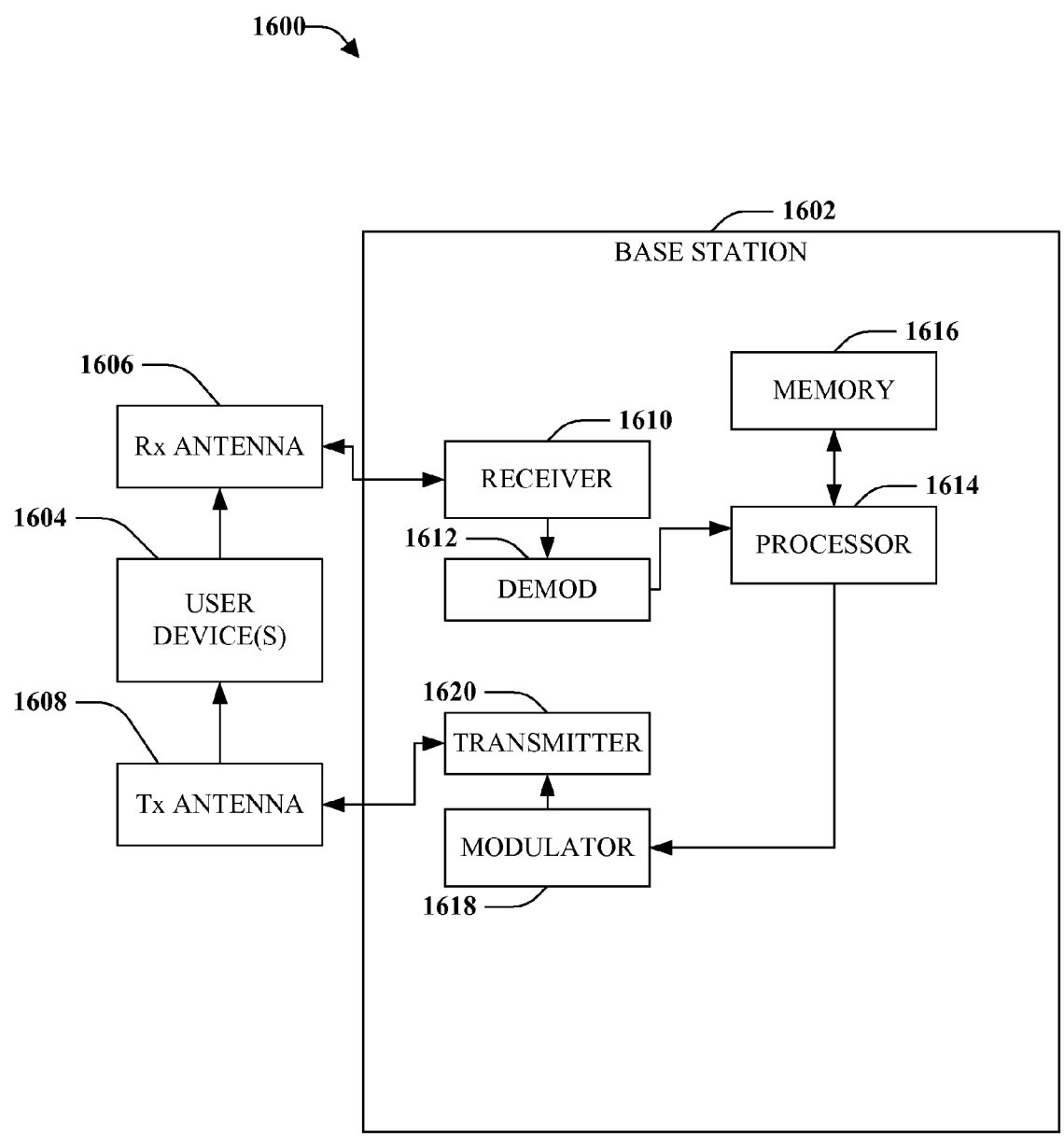
FIG. 16 illustrates a system that facilitates transmission of messages in accordance with various aspects presented herein.

FIG. 16 is an illustration of a system 1600 that facilitates transmission of messages in accordance with various aspects presented herein. System 1600 comprises a base station or access point 1602. As illustrated, base station 1602 receives signal(s) from one or more user devices 1604 by a receive antenna 1606, and transmits to the one or more user devices 1604 through a transmit antenna 1608.

Base station 1602 comprises a receiver 1610 that receives information from receive antenna 1606 and is operatively associated with a demodulator 1612 that demodulates received information. Demodulated symbols are analyzed by a processor 1614 that is coupled to a memory 1616 that stores information related to broadcast-multicast waveforms embedded in a unicast waveform. A modulator 1618 can multiplex the signal for transmission by a transmitter 1620 through transmit antenna 1608 to user devices 1604.

In accordance with some aspects, memory 1616 can be configured to retain and processor 1614 can be configured to execute instructions relating to generating a message through protocols in a unicast stack associated with base station 1602. The instructions can also relate to tunneling the message to a broadcast/multicast Inter-Route Tunneling Protocol (B-IRTP), and transmitting the message on a BCMC channel. The access node and the BCMC Access Node can communicate over an IOS interface. In accordance with other aspects, memory 1616 can be configured to retain and processor 1614 can be configured to execute instructions relating to generating a message through protocols in a broadcast/multicast (BCMC) stack and transmitting the message over a unicast waveform for rendering on a mobile device.

Figure 17:
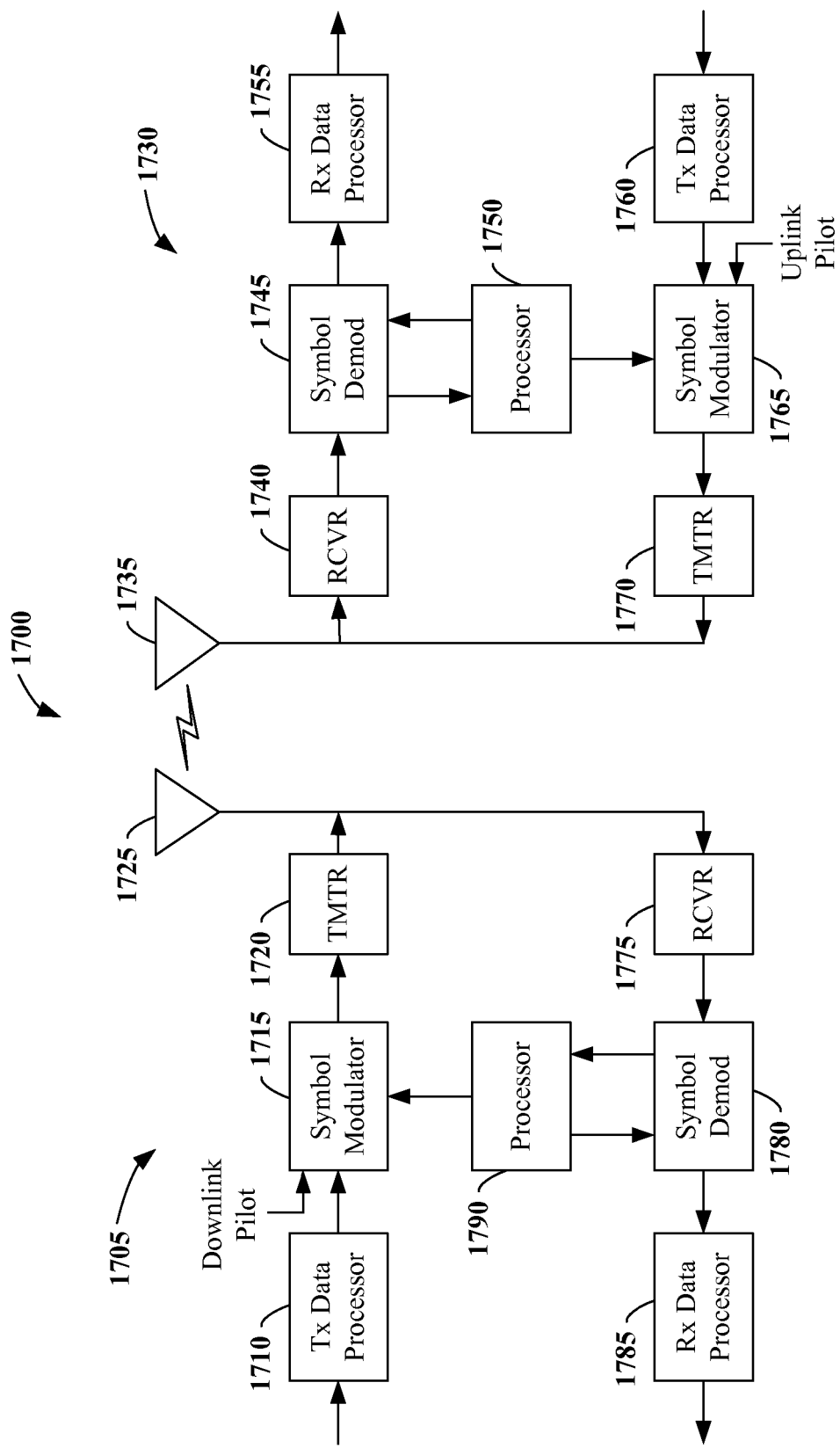
FIG. 17 illustrates an exemplary wireless communication system.

FIG. 17 illustrates an exemplary wireless communication system 1700. Wireless communication system 1700 depicts one base station and one terminal for sake of brevity. However, it is to be appreciated that system 1700 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 17, on a downlink, at access point 1705, a transmit (TX) data processor 1710 receives, formats, codes, interleaves, and modulates (or symbol maps) traffic data and provides modulation symbols ("data symbols"). A symbol modulator 1715 receives and processes the data symbols and pilot symbols and provides a stream of symbols. A symbol modulator 1715 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1720 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1725 to the terminals. At terminal 1730, an antenna 1735 receives the downlink signal and provides a received signal to a receiver unit (RCVR) 1740. Receiver unit 1740 conditions (e.g., filters, amplifies, and frequency downconverts) the received signal and digitizes the conditioned signal to obtain samples. A symbol demodulator 1745 obtains N received symbols and provides received pilot symbols to a processor 1750 for channel estimation. Symbol demodulator 1745 further receives a frequency response estimate for the downlink from processor 1750, performs data demodulation on the received data symbols to obtain data symbol estimates (which are estimates of the transmitted data symbols), and provides the data symbol estimates to an RX data processor 1755, which demodulates (i.e., symbol demaps), deinterleaves, and decodes the data symbol estimates to recover the transmitted traffic data. The processing by symbol demodulator 1745 and RX data processor 1755 is complementary to the processing by symbol modulator 1715 and TX data processor 1710, respectively, at access point 1705.

On the uplink, a TX data processor 1760 processes traffic data and provides data symbols. A symbol modulator 1765 receives and multiplexes the data symbols with pilot symbols, performs modulation, and provides a stream of symbols. A transmitter unit 1770 then receives and processes the stream of symbols to generate an uplink signal, which is transmitted by the antenna 1735 to the access point 1705.

At access point 1705, the uplink signal from terminal 1730 is received by the antenna 1725 and processed by a receiver unit 1775 to obtain samples. A symbol demodulator 1780 then processes the samples and provides received pilot symbols and data symbol estimates for the uplink. An RX data processor 1785 processes the data symbol estimates to recover the traffic data transmitted by terminal 1730. A processor 1790 performs channel estimation for each active terminal transmitting on the uplink.

Processors 1790 and 1750 direct (e.g., control, coordinate, manage, . . . ) operation at access point 1705 and terminal 1730, respectively. Respective processors 1790 and 1750 can be associated with memory units (not shown) that store program codes and data. Processors 1790 and 1750 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof With software, implementation can be through modules (e.g., procedures, functions, and so on) that perform the functions described herein. The software codes may be stored in memory unit and executed by the processors 1790 and 1750.

Figure 18:
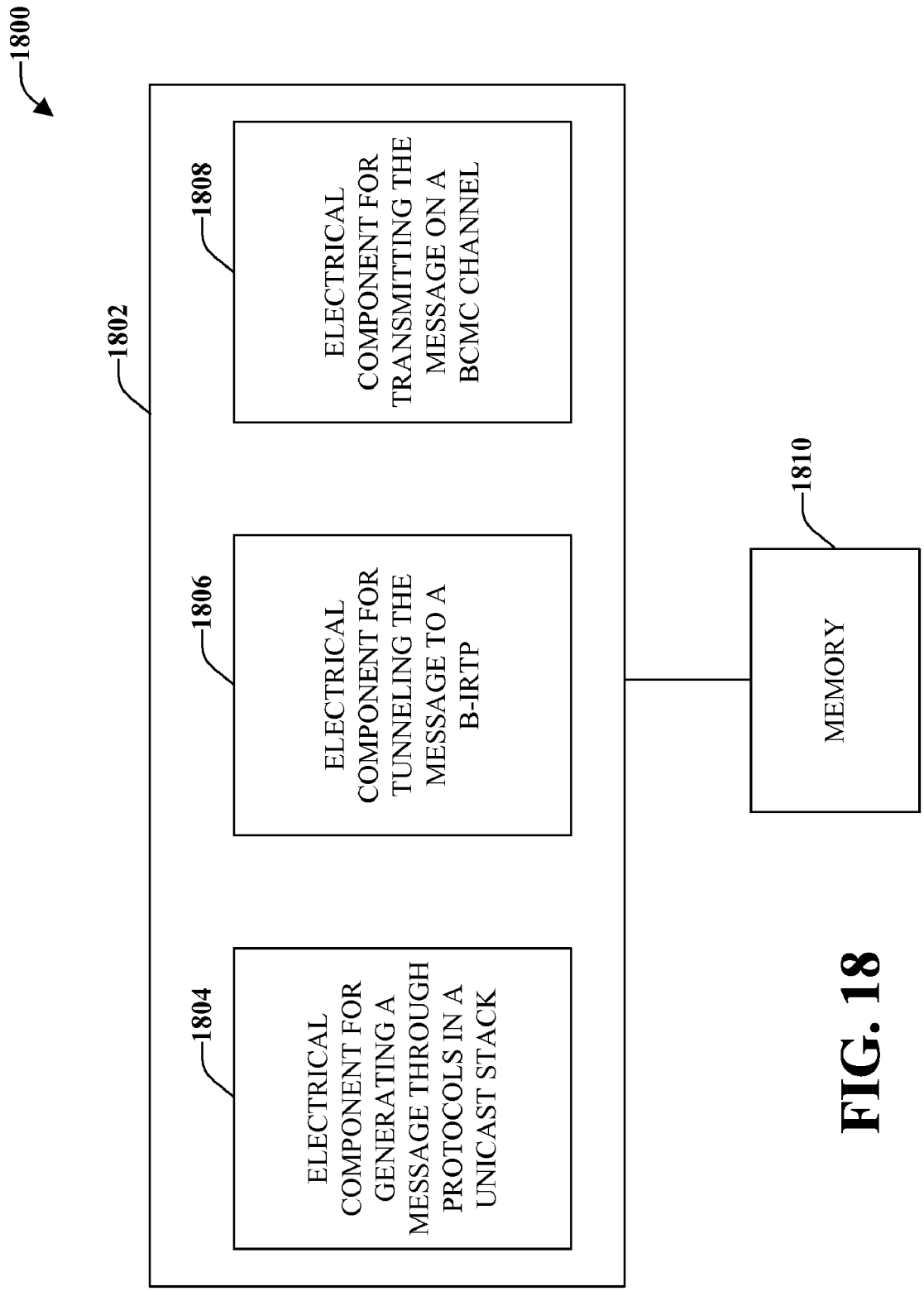
FIG. 18 illustrates an example system that tunnels multi-user packets of a unicast waveform over a broadcast-multicast waveform.

With reference to FIG. 18, illustrated is an example system 1800 that tunnels multi-user packets of a unicast waveform over a broadcast-multicast waveform. System 1800 can be utilized in a situation when there is an emergency or another reason why all users within a communication network should receive a similar message (e.g., message that a tornado has been sighted in the area, message that a bank robbery is in process, message that a child has gone missing, and so forth). These messages can be sent as a packet that is not a BCMC packet but can be received by multiple terminals in the network. System 1800 may reside at least partially within a base station. It is to be appreciated that system 1800 is represented as including functional blocks, which may be functional blocks that represent functions implemented by a processor, software, or combination thereof (e.g., firmware).

System 1800 includes a logical grouping 1802 of electrical components that can act separately or in conjunction. Logical grouping 1802 can include an electrical component for generating a message through protocols in a unicast stack 1804. The unicast stack can be associated with an access node. Further, logical grouping 1802 can comprise an electrical component for tunneling the message to a broadcast/multicast Inter-Route Tunneling Protocol (B-IRTP) 1806. The B-IRTP can be included in a broadcast/multicast (BCMC) Access Node. The access node and the BCMC Access Node can communicate over an IOS interface.

Logical grouping 1802 can also include an electrical component for transmitting the message on a BCMC channel 1808. The message can be transmitted to an access terminal for output to a user. In accordance with some aspects, the message can be transmitted by electrical component 1808 based on an AN-centric model. In an AN-centric model, a MulticastIP/Port-to-BCMCFlowID is maintained per access node. In accordance with some aspects, the message can be transmitted based on a region-centric model. In a region-centric model a MulticastIP/Port-to-BCMCFlowID is maintained regionally. According to some aspects, the message is transmitted on a broadcast physical channel. In according to some aspects, logical grouping 1802 can include an electrical component for routing the message through a B-PCP/B-MAC/B-PHY of the BCMC Access Node before transmitting the message.

Additionally, system 1800 can include a memory 1810 that retains instructions for executing functions associated with electrical components 1804, 1806, and 1808 or other components. While shown as being external to memory 1810, it is to be understood that one or more of electrical components 1804, 1806, and 1808 can exist within memory 1810.

Figure 19:
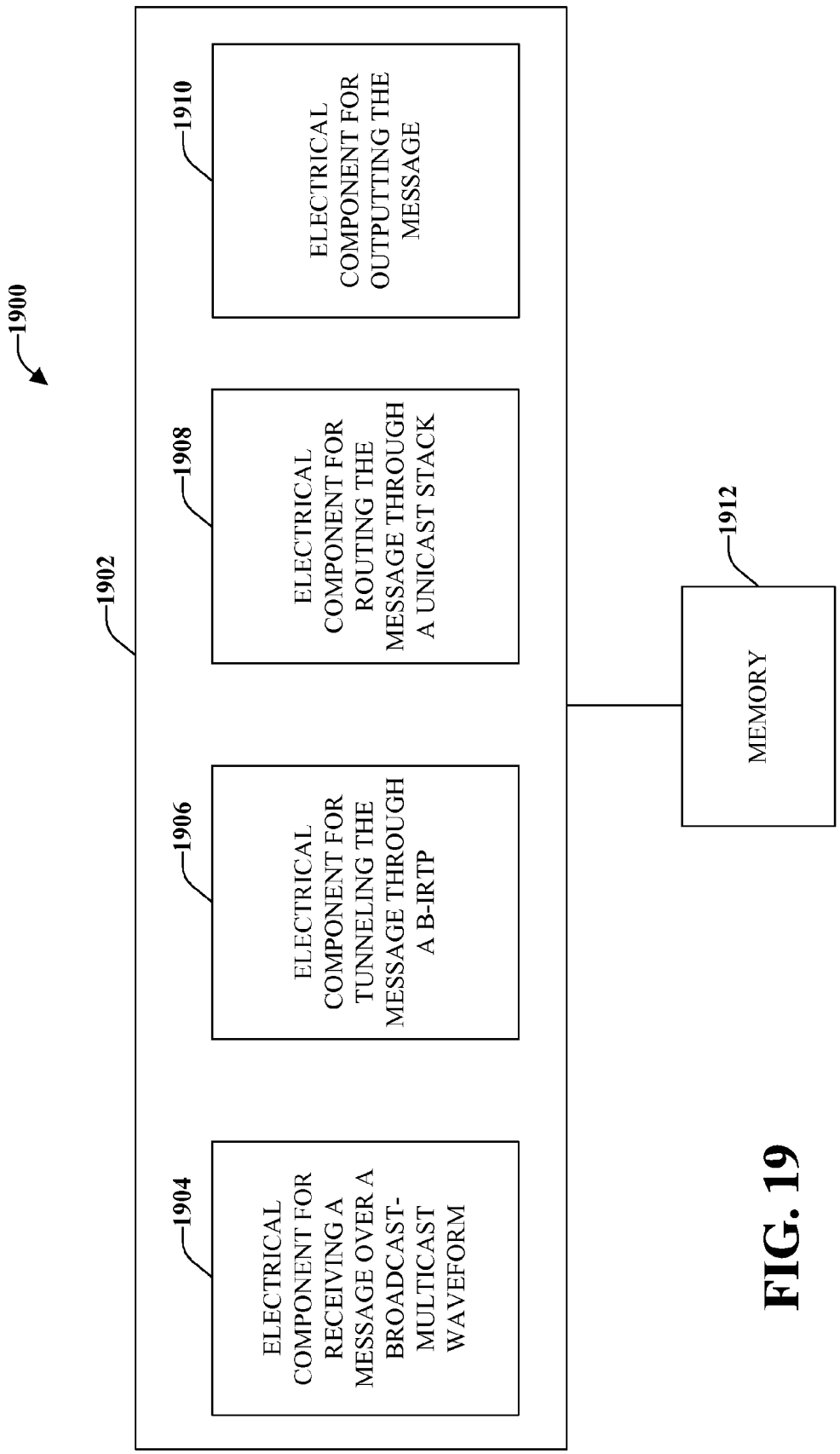
FIG. 19 illustrates an example system that receives multi-user packets of a unicast waveform over a broadcast-multicast waveform.

With reference to FIG. 19, illustrated is an example system 1900 that receives multi-user packets of a unicast waveform over a broadcast-multicast waveform. System 1900 can be configured to receive messages that can be received by multiple terminals as if the message was sent as a BCMC packet. System 1900 can reside at least partially within a mobile device. It is to be appreciated that system 1900 is represented as including functional blocks, which can be functional blocks that represent functions implemented by a processor, software, or combination thereof (e.g., firmware).

System 1900 includes a logical grouping 1902 of electrical components that can act separately or in conjunction. Logical grouping 1902 can include an electrical component for receiving a message over a broadcast-multicast waveform 1904. The message received over the broadcast-waveform can be an AN-centric deployment-model, wherein the MulticastIP/Port-to-BCMCFlowID is maintained per access node. In accordance with some aspects, the message received over the broadcast-waveform can be a region-centric deployment-model, wherein the MulticastIP/Port-to-BCMCFlowID is maintained regionally. In some aspects, the message is received on a broadcast physical channel.

Logical grouping 1902 can also comprise an electrical component for tunneling the message though a B-IRTP 1906 and an electrical component for routing the message though a unicast stack 1908. Moreover, logical grouping 1902 can include an electrical component for outputting the message to a user 1910.

In accordance with some aspects, logical grouping 1902 can include an electrical component for reviewing a type field in a Broadcast Packet Consolidation Protocol (B-PCP) header of the message before routing the message though the unicast stack. The type field can indicate whether the message is a BCMC signaling message. According to some aspects, logical grouping 1902 can include an electrical component for reviewing a type field in a Broadcast Packet Consolidation Protocol (B-PCP) header to determine if the message is a BCMC signaling message. The B-PCP can perform framing of higher layer packets. In accordance with some aspects, logical grouping 1902 can include an electrical component for analyzing a begin filed of the B-PCP to ascertain a first fragment of the higher layer packet and an electrical component for analyzing an end field of the B-PCP to ascertain a last fragment of the higher layer packet.

Additionally, system 1900 can include a memory 1912 that retains instructions for executing functions associated with electrical components 1904, 1906, 1908 and 1910 or other components. While shown as being external to memory 1912, it is to be understood that one or more of electrical components 1904, 1906, 1908 and 1910 can exist within memory 1912.

Figure 20:
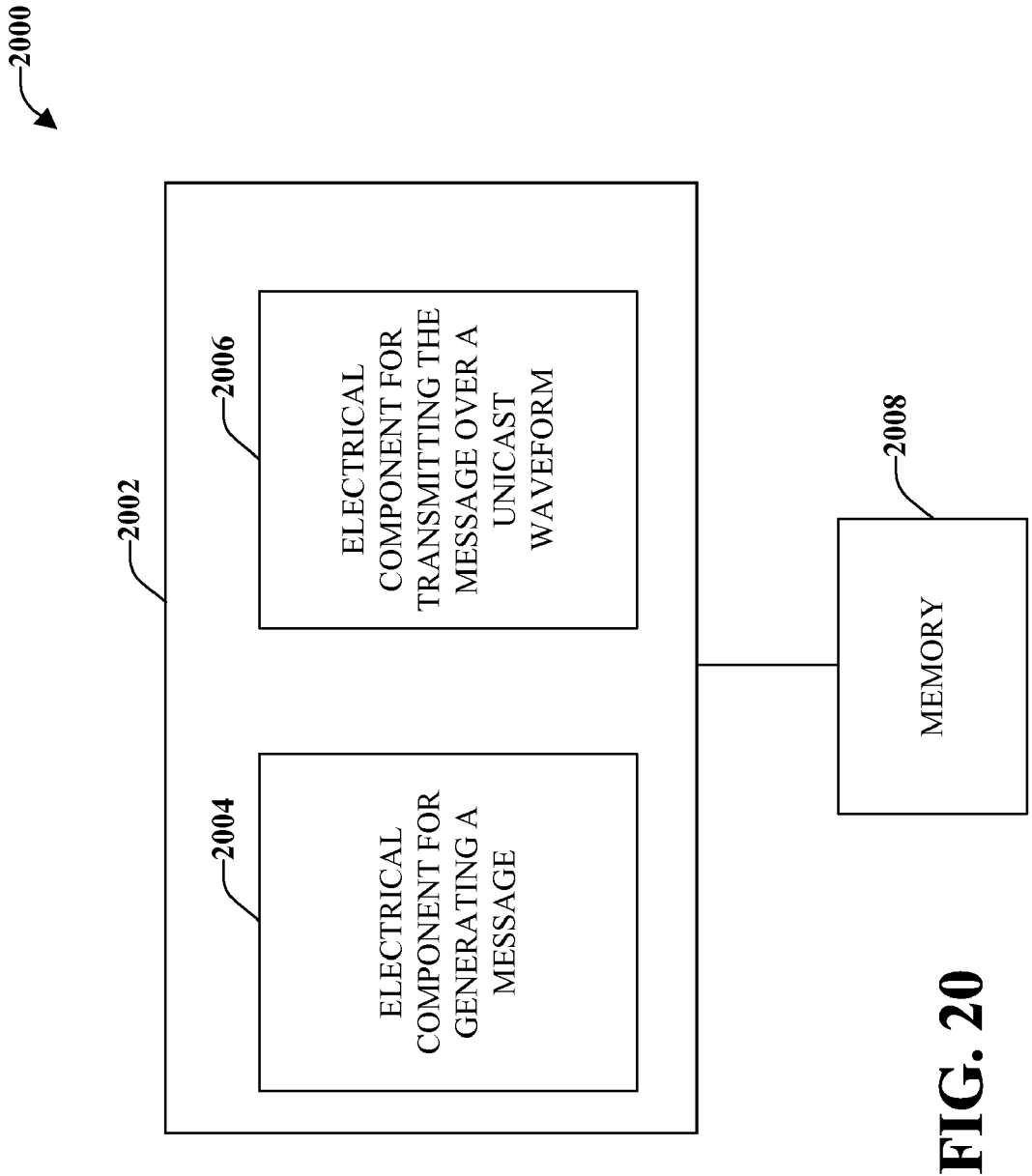
FIG. 20 illustrates an example system that tunnels out of band signaling of a broadcast-multicast waveform over a unicast waveform.

With reference to FIG. 20, illustrated is an example system 2000 that tunnels out of band signaling of a broadcast-multicast waveform over a unicast waveform. System 2000 can reside at least partially within a base station. It is to be appreciated that system 2000 is represented as including functional blocks, which can be functional blocks that represent functions implemented by a processor, software, or combination thereof (e.g., firmware).

System 2000 includes a logical grouping 2002 of electrical components that can act separately or in conjunction. Logical grouping 2002 can include an electrical component for generating a message 2004. The message can be generated through protocols in a broadcast/multicast (BCMC) stack. Generating the message can be performed by a BCMC Access Node that communicates with a serving access node through an IOS interface. Further, logical grouping 2002 can comprise an electrical component for transmitting the message over a unicast waveform 2006. The message can be transmitted so that the message can be rendered (e.g., audio, visual, and so forth) on a mobile device. The message can be transmitted to a unicast stack of a mobile device, for example.

In accordance with some aspects, logical grouping 2002 can include an electrical component for tunneling the message though an Inter-Route Tunneling Protocol (IRTP) of a serving access node before transmitting the message over the unicast channel. In accordance with some aspects, logical grouping 2002 can include an electrical component for transmitting the message on a physical channel of a unicast stack and/or an electrical component for transmitting the message using a Broadcast MACID to allow a plurality of mobile devices to receive the generated message. Additionally, logical grouping 2002 can include an electrical component for including a structure of a BCMC waveform in the generated message.

Additionally, system 2000 can include a memory 2008 that retains instructions for executing functions associated with electrical components 2004 and 2006 or other components. While shown as being external to memory 2008, it is to be understood that one or more of electrical components 2004 and 2006 can exist within memory 2008.

Figure 21:
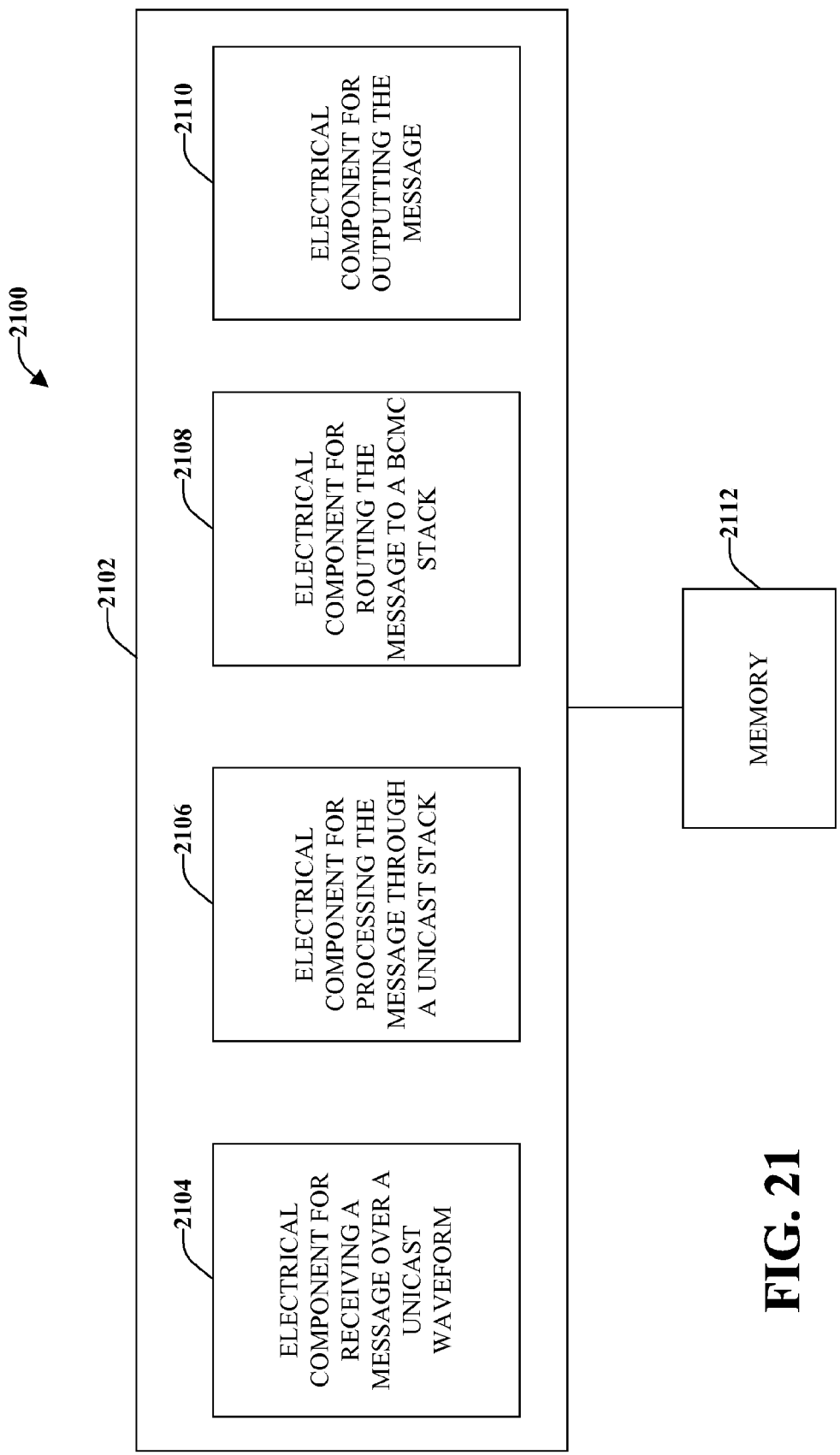
FIG. 21 illustrates an example system that receives a tunneled out of band signaling of a broadcast-multicast waveform over a unicast waveform.

With reference to FIG. 21, illustrated is an example system 2100 that receives a tunneled out of band signaling of a broadcast-multicast waveform over a unicast waveform. System 2100 can reside at least partially within a mobile device. It is to be appreciated that system 2100 is represented as including functional blocks, which can be functional blocks that represent functions implemented by a processor, software, or combination thereof (e.g., firmware).

System 2100 includes a logical grouping 2102 of electrical components that can act separately or in conjunction. Logical grouping 2102 can include an electrical component for receiving a message over a unicast waveform 1204. The message can be received on a unicast channel and can be from a serving access node. The received message can be a BCMC protocol message that was sent with a Broadcast MACID. In accordance with some aspects, the received message contains information about a structure of a BCMCS waveform. Additionally or alternatively, the received message is from a serving access node that communicates with a BCMC Access Node though an IOS interface.

Logical grouping 2102 can comprise an electrical component for processing the message through a unicast stack 2106. Further, logical grouping 2102 can comprise an electrical component for routing the message to a broadcast/multicast (BCMC) stack 2108. Additionally, logical grouping 2102 can include an electrical component for outputting the message to a user 2110.

Additionally, logical grouping 2102 can include an electrical component for tunneling the message though an Inter-Route Tunneling Protocol (IRTP) before routing the message to the BCMC stack. Additionally or alternatively, logical grouping 2102 can include an electrical component for transmitting the message through a PHY MAC of the unicast stack before routing the message to the BCMC Stack.

Further, system 2100 can include a memory 2112 that retains instructions for executing functions associated with electrical components 2104, 2106, 2108, and 2110 or other components. While shown as being external to memory 2112, it is to be understood that one or more of electrical components 2104, 2106, 2108, and 2110 can exist within memory 2112.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

The invention claimed is:

1. A method for receiving tunneled multi-user packets of unicast waveform over a broadcast-multicast waveform, comprising:
   receiving a message over a broadcast-multicast waveform;
   tunneling the message though a broadcast/multicast Inter-Route Tunneling Protocol (B-IRTP);
   routing the message though a unicast stack; and
   outputting the message to a user.

2. The method of claim 1, further comprising:
   reviewing a type field in a Broadcast Packet Consolidation Protocol (B-PCP) header of the message before routing the message though the unicast stack, wherein the type field indicates whether the message is a BCMC signaling message.

3. The method of claim 1, receiving a message over a broadcast-multicast waveform is an AN-centric deployment-model, wherein the MulticastIP/Port-to-BCMCFlowID is maintained per access node.

4. The method of claim 1, receiving a message over a broadcast-multicast waveform is a region-centric deployment-model, wherein the MulticastIP/Port-to-BCMCFlowID is maintained regionally.

5. The method of claim 1, wherein the message is received on a broadcast physical channel.

6. The method of claim 1, further comprising:
reviewing a type field in a Broadcast Packet Consolidation Protocol (B-PCP) header to determine if the message is a BCMC signaling message, wherein the B-PCP performs framing of higher layer packets.

7. The method of claim 6, further comprising:
analyzing a begin filed of the B-PCP to ascertain a first fragment of the higher layer packet; and
analyzing an end field of the B-PCP to ascertain a last fragment of the higher layer packet.

8. A wireless communications apparatus, comprising:
a memory that retains instructions relating to receiving a message over a broadcast-multicast waveform, tunneling the message though a B-IRTP, routing the message though a unicast stack, and outputting the message to a user; and
a processor, coupled to the memory, configured to execute the instructions retained in the memory.

9. The wireless communications apparatus of claim 8, the memory further retains instructions relating to reviewing a type field in a Broadcast Packet Consolidation Protocol (B-PCP) header of the message before routing the message though the unicast stack, wherein the type field indicates whether the message is a BCMC signaling message.

10. The wireless communications apparatus of claim 8, the memory further retains instructions relating to receiving a message over a broadcast-multicast waveform is an AN-centric deployment-model, wherein the MulticastIP/Port-to-BCMCFlowID is maintained per access node.

11. The wireless communications apparatus of claim 8, the memory further retains instructions relating to receiving a message over a broadcast-multicast waveform is a region-centric deployment-model, wherein the MulticastIP/Port-to-BCMCFlowID is maintained regionally.

12. The wireless communications apparatus of claim 8, wherein the message is received on a broadcast physical channel.

13. The wireless communications apparatus of claim 8, the memory further retains instructions relating to reviewing a type field in a Broadcast Packet Consolidation Protocol (B-PCP) header to determine if the message is a BCMC signaling message, wherein the B-PCP performs framing of higher layer packets.

14. The wireless communications apparatus of claim 13, the memory further retains instructions relating to analyzing a begin filed of the B-PCP to ascertain a first fragment of the higher layer packet and analyzing an end field of the B-PCP to ascertain a last fragment of the higher layer packet.

15. A wireless communications apparatus that receives multi-user packets of a unicast waveform over a broadcast-multicast waveform, comprising:
means for receiving a message over a broadcast-multicast waveform;
means for tunneling the message though a B-IRTP;
means for routing the message though a unicast stack; and
means for outputting the message to a user.

16. The wireless communications apparatus of claim 15, further comprising:
means for reviewing a type field in a Broadcast Packet Consolidation Protocol (B-PCP) header of the message before routing the message though the unicast stack, wherein the type field indicates whether the message is a BCMC signaling message.

17. The wireless communications apparatus of claim 15, wherein receiving a message over a broadcast-multicast waveform is an AN-centric deployment-model, wherein the MulticastIP/Port-to-BCMCFlowID is maintained per access node.

18. The wireless communications apparatus of claim 15, wherein receiving a message over a broadcast-multicast waveform is a region-centric deployment-model, wherein the MulticastIP/Port-to-BCMCFlowID is maintained regionally.

19. The wireless communications apparatus of claim 15, wherein the message is received on a broadcast physical channel.

20. The wireless communications apparatus of claim 15, further comprising:
means for reviewing a type field in a Broadcast Packet Consolidation Protocol (B-PCP) header to determine if the message is a BCMC signaling message, wherein the B-PCP performs framing of higher layer packets.

21. The wireless communications apparatus of claim 20, further comprising:
means for analyzing a begin filed of the B-PCP to ascertain a first fragment of the higher layer packet; and means for analyzing an end field of the B-PCP to ascertain a last fragment of the higher layer packet.

22. A machine-readable non-transitory medium having stored thereon machine-executable instructions for receiving tunneled multi-user packets of a unicast waveform over a broadcast-multicast waveform, comprising:
receiving a message over a broadcast-multicast waveform;
tunneling the message though a B-IRTP;
routing the message though a unicast stack; and
outputting the message to a user.

23. The machine-readable non-transitory medium of claim 22, wherein receiving a message over a broadcast-multicast waveform is an AN-centric deployment-model, wherein the MulticastIP/Port-to-BCMCFlowID is maintained per access node.

24. The machine-readable non-transitory medium of claim 22, wherein receiving a message over a broadcast-multicast waveform is a region-centric deployment-model, wherein the MulticastIP/Port-to-BCMCFlowID is maintained regionally.

25. In a wireless communications system, an apparatus comprising:
a processor configured to:
receive a message over a broadcast-multicast waveform;
tunnel the message though a B-IRTP;
review a type field in a Broadcast Packet Consolidation Protocol (B-PCP) header;
route the message though a unicast stack; and
output the message to a user, wherein the type field indicates whether the message is a BCMC signaling message.

* * * * *